(12) United States Patent
Mizuno et al.

(10) Patent No.: US 6,597,007 B2
(45) Date of Patent: Jul. 22, 2003

(54) OPTICAL POSITION DETECTION DEVICE AND DISTANCE MEASUREMENT DEVICE

(75) Inventors: Seiichiro Mizuno, Hamamatsu (JP); Akira Kurahashi, deceased, late of Hamamatsu (JP), by Takako Kurahashi, legal representitive; Izumi Adachi, Hamamatsu (JP)

(73) Assignee: Hamamatsu Photonics K.K., Hamamatsu (JP)

( * ) Notice: Subject to any disclaimer, the term of this patent is extended or adjusted under 35 U.S.C. 154(b) by 60 days.

(21) Appl. No.: 10/005,844

(22) Filed: Dec. 7, 2001

(65) Prior Publication Data

US 2002/0074530 A1 Jun. 20, 2002

Related U.S. Application Data

(63) Continuation-in-part of application No. PCT/JP00/03966, filed on Jun. 9, 2000.

(30) Foreign Application Priority Data

Jun. 9, 1999 (JP) .......................................... P11-162606

(51) Int. Cl.[7] .......................... G01C 3/06; G01B 11/00; H01L 31/16
(52) U.S. Cl. ............................. 250/559.38; 250/559.39; 356/622; 356/221
(58) Field of Search ........................ 250/559.38, 214 R, 250/221, 559.29, 559.35, 559.39; 356/619, 620, 622, 221, 222

(56) References Cited

U.S. PATENT DOCUMENTS

| 4,589,773 A | * | 5/1986 | Ido et al. ............... 250/559.38 |
| 4,629,882 A | * | 12/1986 | Matsuda et al. ........ 250/214 R |
| 4,761,547 A | * | 8/1988 | Torihata et al. ......... 250/214 R |
| 5,337,116 A | | 8/1994 | Nonaka et al. ............. 354/403 |
| 5,534,991 A | | 7/1996 | Maeda et al. .............. 356/3.06 |
| 5,572,012 A | | 11/1996 | Saito et al. .............. 250/201.6 |
| 5,644,385 A | | 7/1997 | Mizuno ..................... 356/3.04 |
| 6,483,121 B1 | * | 11/2002 | Ohishi et al. .......... 250/559.38 |

FOREIGN PATENT DOCUMENTS

| EP | 0 679 869 A2 | 11/1995 |
| JP | 2-247504 | 10/1990 |
| JP | 6-160083 | 6/1994 |
| JP | 6-241786 | 9/1994 |

* cited by examiner

Primary Examiner—Christopher W. Fulton
(74) Attorney, Agent, or Firm—Morgan, Lewis & Bockius LLP

(57) ABSTRACT

A signal current I1 that is output from output terminal of semiconductor position detection element is converted to a signal voltage V1 by a current/voltage conversion unit and a signal current I2 that is output from output terminal is converted to a signal voltage V2 by a current/voltage conversion unit. Signal voltages V1 and V2 are compared in magnitude by a comparison circuit and a comparison signal is output so that maximum signal Vmax and minimum signal Vmin are selected. In A/D conversion circuit, the A/D conversion range is set using maximum signal Vmax, and minimum signal Vmin is converted to a digital signal and output. The position of beam incidence on semiconductor position detection element is found by incidence position calculating unit using the comparison signal and digital signal.

14 Claims, 12 Drawing Sheets

*Fig.7A* LIGHT-DIRECTING UNIT 20 TURNED ON
*Fig.7B* SW2 (RM SIGNAL)
*Fig.7C* SW11 (ST SIGNAL)
*Fig.7D* SW12 (RS1 SIGNAL)
*Fig.7E* INTEGRATING CIRCUIT 111 OUTPUT
*Fig.7F* SW31 (CSW SIGNAL)
*Fig.7G* SW32 (RS2 SIGNAL)
*Fig.7H* DIFFERENCE CALCULATING CIRCUIT 131 OUTPUT
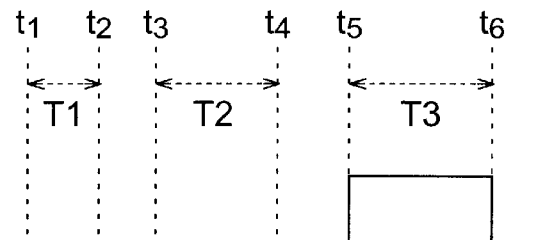

OPTICAL POSITION DETECTION DEVICE AND DISTANCE MEASUREMENT DEVICE

RELATED APPLICATION

This is a continuation-in-part application of application serial no. PCT/JP00/03766 filed on Jun. 9, 2000, now pending.

BACKGROUND OF THE INVENTION

1. Field of the Invention

The present invention relates to an optical position detection device employing a semiconductor position detection element and to a distance measurement device wherein object distance is measured by using an optical position detection device to detect the reflected light of a spot beam or slit beam illuminating this object.

2. Related Background Art

In a semiconductor position detection element, incident light is subjected to photoelectric conversion to generate a photoelectric current (carriers) and, dependent on the position of incidence of the beam, a first signal current I1 is output from a first output terminal and a second signal current I2 is output from a second output terminal. The sum (I1+I2) of the first signal current and second signal current depends on the incident light beam intensity. If the sum (I1+I2) of the first signal current and second signal current is fixed, the difference (I1−I2) of the first signal current and second signal current corresponds to the position of incidence of the beam. An optical position detection device detects the position of beam incidence using such a semiconductor position detection element. Also, a distance measurement device comprises a light-emitting unit in addition to this optical position detection device and the distance to the object is detected by photodetection by the semiconductor position detection element in the optical position detection device of the reflected light of a spot beam illuminating the object by the light-emitting unit.

In a conventional optical position detection device the ratio (V1/V2) of a first signal voltage V1 derived from the first signal current I1 output from the semiconductor position detection element and a second signal voltage V2 derived from the second signal current I2, is found and is used as an output indicating the position of beam incidence. Alternatively, in a conventional optical position detection device, the sum of the first signal voltage V1 and the second signal voltage V2 (V1+V2) and the difference (V1−V2) are found, the difference is divided by the sum, and the result of this division ((V1−V2)/(V1+V2)) is used as an output indicating the position of beam incidence (see for example Laid-open Japanese Patent Publication No. H.2-247504). Thus, in a conventional optical position detection device, in whichever case, division means were considered to be necessary for obtaining an output indicating the position of beam incidence on the semiconductor position detection element. In addition, the foregoing publication discloses a technique for improving resolution of the position of beam incidence wherein the signal voltages that are respectively to constitute the divisor and dividend are multiplied by a suitable multiplication factor before being subjected to A/D conversion, after which division is performed in order to output the result of this division as a digital value in a suitable range.

SUMMARY OF THE INVENTION

The division means in a conventional optical position detection device as described above may be realized by either analogue circuitry or digital circuitry but hardware costs are high owing to the difficulty of miniaturization due to the size of this circuitry, or the time required for division processing is long due to the large amount of calculation. Also, miniaturization of the division means disclosed in the above publication is difficult and hardware costs are high owing to the need to provide a large number of amplification circuits and A/D conversion circuits.

Furthermore, if a plurality of semiconductor position detection elements are provided, if only a single set of the processing circuits (including the current/voltage conversion circuit, division circuit, amplification circuit and A/D conversion circuit etc) that find the position of beam incidence from the signal current output from the semiconductor position detection elements is provided, the time required for finding the position of beam incidence is further lengthened. On the other hand, if the same number of the aforesaid processing circuits are provided as the number of semiconductor position detection elements, the size of the circuitry is further increased and hardware costs are further raised.

Conventional distance measurement devices including such optical position detection devices are likewise subject to the problems of large circuit size and long processing time.

The present invention was made in order to solve the problems mentioned above, its object being to provide an optical position detection device wherein the size of the circuitry is small, processing time short, and excellent resolution of the position of beam incidence output as a digital signal is obtained and a distance measurement device employing such an optical position detection device. A first optical position detecting device according to the present invention comprises: (1) a semiconductor position detection element whereby an incident beam is subjected to photoelectric conversion, and that outputs a first signal current from a first output terminal and outputs a second signal current from a second output terminal in response to the position of incidence of this beam; (2) a first current/voltage conversion unit that inputs the first signal current that is output from the first output terminal of the semiconductor position detecting element and outputs a first signal voltage in accordance with this first signal current; (3) a second current/voltage conversion unit that inputs the second signal current that is output from the second output terminal of the semiconductor position detecting element and outputs a second signal voltage in accordance with this second signal current; (4) a selection circuit that compares the magnitude of the respective values of the first signal voltage output from the first current/voltage conversion unit and the second signal voltage output from the second current/voltage conversion unit and that outputs a comparison signal indicating the result of this comparison and, of the first and the second signal voltages, respectively selects and outputs a maximum signal (maximum signal voltage) whose voltage is the larger and a minimum signal (minimum signal voltage) whose voltage is the smaller; (5) an A/D conversion circuit wherein an A/D conversion range is set in accordance with the maximum signal output from the selection circuit and that converts the minimum signal output from the selection circuit into a digital signal and outputs this digital value; and (6) an incidence position calculating unit that finds the incidence position of the beam on the semiconductor position detecting element, using the comparison signal output from the selection circuit and the digital output which is output from the A/D conversion circuit.

With the first optical position detection device according to the present invention, when a beam of light is incident on the semiconductor position detection element, this beam is subjected to photoelectric conversion and, depending on the position of incidence of this beam, a first signal current I1 is output from the first output terminal and a second signal current I2 is output from the second output terminal. The first signal current I1 is input to the first current/voltage conversion unit so that a first signal voltage V1 is output based on this first signal current I1. In the same way, the second signal current I2 is input to the second current/voltage conversion unit so that a second signal voltage V2 is output based on this second signal current I2. The first and second signal voltages V1 and V2 are respectively input to the selection circuit where the magnitudes of their respective values are compared and a comparison signal indicating the comparison result is output and, of the first and second of signal voltages V1 and V2, that of larger voltage is designated as maximum signal Vmax and that of smaller voltage is designated as the minimum signal Vmin, these being respectively selected and output. In the A/D conversion circuit, an A/D conversion range is then set in accordance with the maximum signal Vmax which is output from the selection circuit. Suitably, by setting the A/D conversion range equal to the maximum signal Vmax voltage, the entire A/D conversion range can be effectively utilized. Also, the A/D conversion circuit converts the voltage of the minimum signal Vmin that is output from the selection circuit to a digital signal and outputs its digital value. This digital value indicates the ratio (Vmin/Vmax). The position of beam incidence on the semiconductor position detection element is found by the incidence position calculating unit from the comparison signal that is output from the selection circuit and the digital output that is output from the A/D conversion circuit. Division processing can therefore be implemented substantially concurrently with the A/D conversion in the A/D conversion circuit, making it possible to reduce the circuit size, lowering hardware costs, and to shorten processing time.

Also, a first optical position detection device according to the present invention further comprises a limit detecting unit that monitors the voltage of the maximum signal output from the selection circuit and that outputs a signal indicating the fact, if this voltage is smaller than the threshold value. In this case, the voltage of the maximum signal that is output from the selection circuit is monitored by the limit detecting unit and a signal indicating this fact is output if this voltage is smaller than the threshold value. Spurious detection can therefore been prevented by making a judgment as to whether or not the beam that is to be detected is incident in the photosensitive region of the semiconductor position detection element.

Also, a first optical position detection device according to the present invention may further comprise a plurality of sets of the semiconductor position detecting element, the first current/voltage conversion unit, the second current/voltage conversion unit and the selection circuit wherein the A/D conversion circuit inputs sequentially the maximum signal (maximum signal voltage) and the minimum signal (minimum signal voltage) output from the selection circuits of each set and the incidence position calculating unit sequentially inputs the comparison results (comparison signals) output from the selection circuits of each set. Furthermore, the limit detection unit may sequentially input the maximum signal output from the selection circuit of each set. If a plurality of semiconductor position detection elements are arranged in the form of an array, the position of beam incidence on a two dimensional photosensitive region can be detected. Also, even if the semiconductor optical detection element is constructed in multi-channel form by providing individual first and second current/voltage conversion units and selection circuits for each semiconductor position detection element but providing the A/D conversion circuit, incidence position calculating unit and limit detecting unit in common for each of the semiconductor position detecting elements, circuit size can be reduced and processing time shortened. It should be noted that the maximum signal and minimum signal are found for each set.

A second optical position detecting device according to the present invention comprises: (1) a semiconductor position detection element whereby an incident beam is subjected to photoelectric conversion, and that outputs a first signal current from a first output terminal and outputs a second signal current from a second output terminal in response to the position of incidence of this beam; (2) a first current/voltage conversion unit that inputs the first signal current that is output from the first output terminal of the semiconductor position detecting element and outputs a first signal voltage in accordance with this first signal current; (3) a second current/voltage conversion unit that inputs the second signal current that is output from the second output terminal of the semiconductor position detecting element and outputs a second signal voltage in accordance with this second signal current; (4) an addition circuit that adds the first signal voltage output from the first current/voltage conversion unit and the second signal voltage output from the second current/voltage conversion unit and outputs a sum signal (third signal voltage) indicating the sum obtained by this addition; (5) a selection circuit that selects and outputs the first signal voltage output from the first current/voltage conversion unit or the second signal voltage output from the second current/voltage conversion unit; and (6) an A/D conversion circuit wherein an A/D conversion range is set in accordance with the sum signal output from the addition circuit and that converts the first or the second signal voltage selected and output by the selection circuit into a digital signal, and outputs its digital value.

With the second optical position detection device according to the present invention, when a beam of light is incident on the semiconductor position detection element, this beam is subjected to photoelectric conversion and, depending on the position of incidence of this beam, a first signal current I1 is output from the first output terminal and a second signal current I2 is output from the second output terminal. The first signal current I1 is input to the first current/voltage conversion unit so that a first signal voltage V1 is output based on this first signal current I1. In the same way, the second signal current I2 is input to the second current/voltage conversion unit so that a second signal voltage V2 is output based on this second signal current I2. The first and second signal voltages V1 and V2 are respectively added by the addition circuit to output a sum signal Vsum=V1+V2 indicating the sum obtained by this addition. Also, the first or second signal voltage V1 or V2 is selected and output by the selection circuit. In the A/D conversion circuit, an A/D conversion range is set in accordance with the sum signal Vsum output from the addition circuit. Suitably, by setting the A/D conversion range equal to the sum signal Vsum voltage, the entire A/D conversion range can be effectively utilized. Also, the A/D conversion circuit converts the first or second signal voltage V1 or V2 selected and output by the selection circuit to a digital signal whose digital value is output. This digital output indicates the ratio (V1/Vsum) or the ratio (V2/Vsum). Consequently, division calculation can be implemented substantially concurrently with A/D conversion by the A/D conversion circuit, so circuit size can be reduced, lowering hardware cost, and processing time shortened. It should be noted that the position of incidence of the beam on the semiconductor position detecting element can be found using the digital value indicating the ratio ((V1−V2)/Vsum); in this case, suitably an incidence position calculating unit is provided wherein the selection circuit sequentially selects the first and second signal voltages V1 and V2, and the A/D conversion circuit sequentially outputs digital signals indicating respectively the ratio (V1/Vsum) and the ratio (V2/Vsum), and, by inputting these digital signals, the ratio of these two is calculated and output.

Also, a second optical position detection device according to the present invention may further comprise a limit detecting unit that monitors the value of the sum signal output from the addition circuit and that outputs a signal indicating the fact, if this value is smaller than the threshold value. In this case, as the value of the sum signal that is output from the addition circuit is monitored by the limit detecting unit, a signal indicating this fact is output if this value is smaller than the threshold value. Spurious detection can therefore been prevented by making a judgment as to whether or not the beam that is to be detected is incident in the photosensitive region of the semiconductor position detection element.

Also a second optical position detection device according to the present invention may comprise a plurality of sets of the semiconductor position detecting element, the first current/voltage conversion unit, the second current/voltage conversion unit, the addition circuit and the selection circuit wherein the A/D conversion circuit inputs sequentially the sum signal output from the addition circuits and the first or the second signal voltage selected and output by the selection circuits of each set. Furthermore, the limit detecting unit may sequentially input the sum signals that are output from the addition circuits of each set. If the plurality of semiconductor position detecting elements are arranged in the form of an array, the position of incidence of the beam in a two dimensional photosensitive region can be detected. Also, even if the semiconductor optical detection element is constructed in multi-channel form by providing individual first and second current/voltage conversion units and addition circuits for each semiconductor position detection element but providing the A/D conversion circuit, incidence position calculating unit and limit detecting unit in common for each of the semiconductor position detecting elements, circuit size can be reduced and processing time shortened. It should be noted that the maximum signal and minimum signal are found for each set.

A first or second optical position detection device according to the present invention used with a light-emitting unit that illuminates the object with a spot beam or slit beam (1) the first current/voltage conversion unit may include: (1a) a first integrating circuit that integrates charge in accordance with the first signal current and outputs a signal voltage corresponding to the amount of this integrated charge; and (1b) a first difference calculating circuit that finds the difference of the signal voltage output from the first integrating circuit when no light from the light-emitting unit illuminates the object and the signal voltage output from the first integrating circuit when light from the light-emitting unit illuminates the object and that outputs the first signal voltage in accordance with this difference; and (2) the second current/voltage conversion unit may include: (2a) a second integrating circuit that integrates charge in accordance with the second signal current and outputs a signal voltage corresponding to the amount of this integrated charge; and (2b) a second difference calculating circuit that finds the difference of the signal voltage output from the second integrating circuit when no light from the light-emitting unit illuminates the object and the signal voltage output from the second integrating circuit when light from the light-emitting unit illuminates the object and that outputs the second signal voltage in accordance with this difference. In this case, in the first (second) current/voltage conversion unit, charge is integrated on the first (second) integrating circuit in accordance with the first (second) signal current, with the result that a signal voltage corresponding to the amount of this integrated charge is output from the first (second) integrating circuit. The difference of the signal voltage that is output from the first (second) integrating circuit when no light from the light-emitting unit illuminates the object and the signal voltage that is output from the first (second) integrating circuit when light from the light-emitting unit illuminates the object is found by the first (second) difference calculating circuit and a first (second) signal voltage is output corresponding to this difference. The background light component is thereby canceled, so that the position of incidence of the beam that is to be detected by the semiconductor position detecting element can be accurately found.

Also, in the first or second optical position detecting the device according to present invention, (1) the first current/voltage conversion unit further includes a first mean background component cancel circuit that cancels the mean value of the contribution of background light from the first signal current that is output from the first output terminal of the semiconductor position detecting element and (2) the second current/voltage conversion unit further includes a second mean background component cancel circuit that cancels the mean value of the contribution of background light from the second signal current that is output from the second output terminal of the semiconductor position detecting element. In this case, since the mean value of the contribution of the background light is canceled by the first (second) mean background component cancel circuit from the first (second) signal current that is output from the first (second) output terminal of the semiconductor position detecting element, the beam incidence position on the semiconductor position detecting element can be even more accurately found.

A distance measurement device according to the present invention comprises: (1) a light-emitting unit that illuminates an object with a spot beam or slit beam; (2) an optical position detection device as aforesaid that detects the reflected light of the light from light-emitting unit illuminating the object; and (3) a distance calculating unit that finds the distance to the object using the position of beam incidence on the semiconductor position detecting element found by the optical position detection device. With a distance measurement device according to the present invention, a spot beam or slit beam from the light-emitting unit illuminates the object and the reflected beam therefrom is detected by the optical position detecting device. The distance to the object is then found from the position of incidence of the beam on the semiconductor position detecting element found by the optical position detecting device by the distance calculating unit.

BRIEF DESCRIPTION OF THE DRAWINGS

FIGS. 7A, 7B, 7C, 7D, 7E, 7F, 7G, and 7H are timing charts given in explanation of the operation of the integrating circuit, mean background component cancel circuit and difference calculating circuit;

DESCRIPTION OF THE PREFERRED EMBODIMENT

Embodiments of the present invention are described in detail below with reference to the appended drawings. In the description of the drawings, identical elements are given the same reference symbols and repeated description is omitted.

(First Embodiment)

Figure 1:
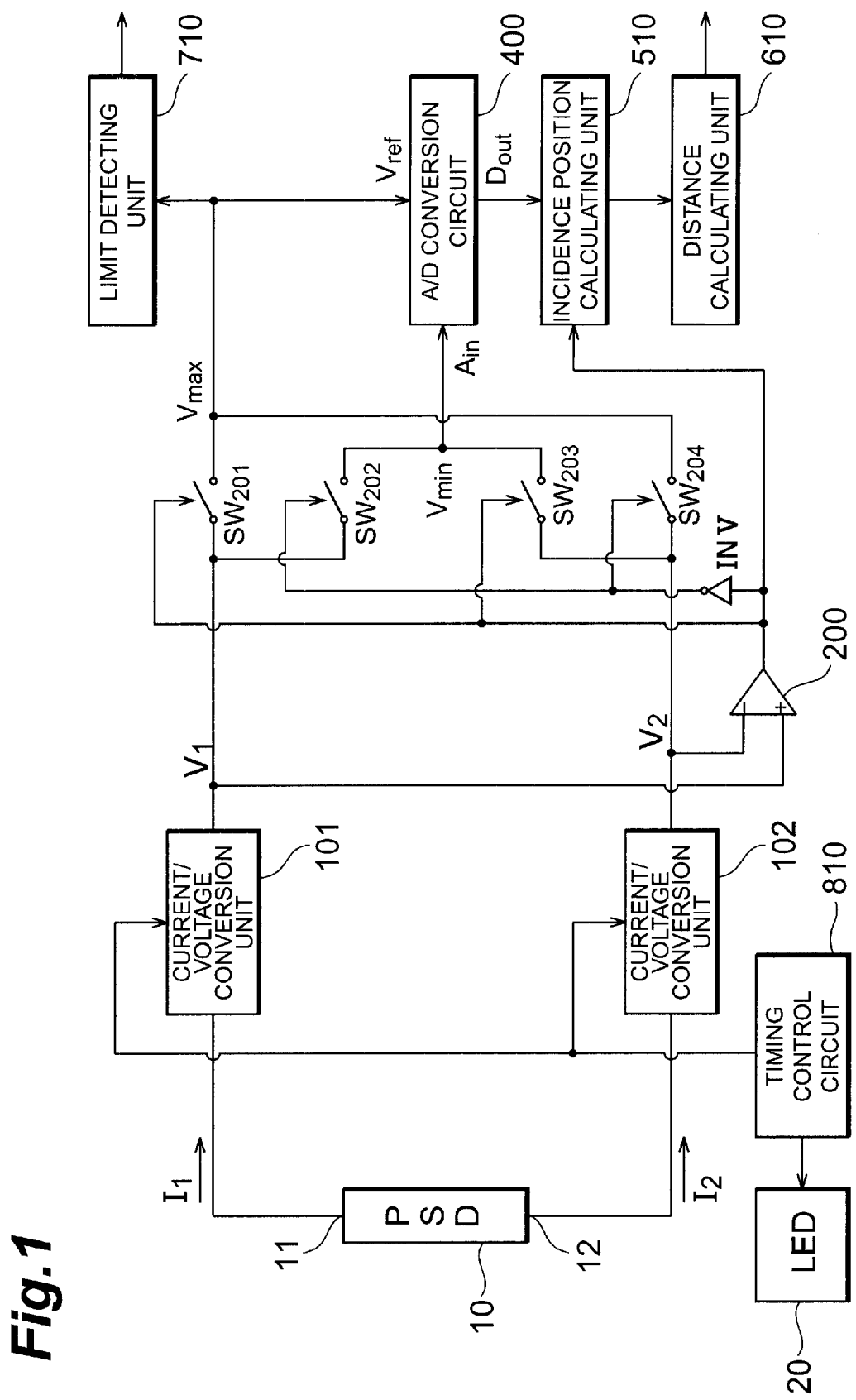
FIG. 1 is a layout diagram of an optical position detection device and distance measurement device according to a first embodiment.

First of all, an optical position detection device and distance measurement device according to a first embodiment will be described. FIG. 1 is a layout diagram of an optical position detection device and distance measurement device according to a first embodiment. An optical position detection device according to this embodiment comprises a semiconductor position detection element 10, first current/voltage conversion unit 101, second current/voltage conversion unit 102, comparison circuit 200, logic inverting circuit INV, switches SW201 to SW204, A/D conversion circuit 400, incidence position calculating unit 510 and limit detecting unit 710. In addition to the optical position detection device, a distance measurement circuit according to this embodiment comprises a light-emitting unit 20 and a distance calculating unit 610. In addition, the optical position detection device and distance measurement device of the present embodiment comprise a timing control circuit 810. Semiconductor position detection element 10 is for example a PSD (position sensitive detector) or wedge type bi-united photodiode, and comprises a first output terminal 11 and second output terminal 12. When a beam of light illuminates the photosensitive region of this semiconductor position detection element 10, a photoelectric current is generated by the photoelectric conversion effect at the position of incidence of this beam. This photoelectric current is distributed in accordance with the distance from the position of beam incidence to the first output terminal 11 and to the second output terminal 12, causing a first signal current I1 to be output from first output terminal 11 and a second signal current I2 to be output from second output terminal 12.

Light-emitting unit 20 is for example a light-emitting diode or laser diode and illuminates the object with a spot beam or slit beam of light with a prescribed timing, under the control of a control signal output from timing control circuit 810. The reflected light from the object is incident on the photosensitive region of semiconductor position detection element 10, after passing through a lens (not shown) arranged in front of semiconductor position detection element 10. The position of beam incidence on semiconductor position detection element 10 corresponds to the object distance. The object distance is found by the principles of trigonometry from the position of beam incidence on semiconductor position detection element 10.

Current/voltage conversion unit 101 inputs first signal current I1 that is output from first output terminal 11 of semiconductor position detection element 10, and outputs first signal voltage V1 derived from this first signal current I1. Likewise, current voltage conversion unit 102 inputs second signal current I2 that is output from second output terminal 12 of semiconductor position detection element 10, and outputs second signal voltage V2 derived from this second signal current I2. Current/voltage conversion units 101 and 102 respectively operate with prescribed timing under the control of control signals output from timing control circuit 810. Current/voltage conversion units 101 and 102 respectively may comprise for example an amplifier and feedback resistance element or may comprise an amplifier and integrating capacitor.

Comparison circuit 200 inputs signal voltage V1 output from current/voltage conversion unit 101 and signal voltage V2 output from current voltage conversion unit 102 and compares the magnitudes of the respective values of signal voltage V1 and signal voltage V2, and outputs a comparison signal indicating the result of this comparison. This comparison signal becomes logic H when the value of signal voltage V1 is larger than the value of signal voltage V2 and becomes logic L otherwise. Logic inversion circuit INV performs logic inversion on the comparison signal that is output from comparison circuit 200, and outputs the inverted logic signal thereof. Switch SW201 is provided between the output terminal of current/voltage conversion unit 101 and the Vref input terminal of A/D conversion circuit 400. Switch SW202 is provided between the output terminal of current/voltage conversion unit 101 and the Ain input terminal of A/D conversion circuit 400. Switch SW203 is provided between the output terminal of current/voltage conversion unit 102 and the Ain input terminal of A/D conversion circuit 400. Switch SW204 is provided between the output terminal of current/voltage conversion unit 102 and the Vref input terminal of A/D conversion circuit 400.

Switches SW201 and SW203 are respectively closed when the comparison signal output from comparison circuit 200 is logic H and open when this comparison signal is logic L. Switches SW202 and SW204 are respectively closed when the inverted logic signal output from logic inversion circuit INV is logic H and open when this inverted logic signal is logic L. That is, switches SW202 and SW204 are respectively closed when the comparison signal output from comparison circuit 200 is logic L and open when this comparison signal is logic H. Thus, the selection circuit, which includes comparison circuit 200 and switches SW201 to SW204, of the signal voltage V1 output from current/voltage conversion unit 101 and the signal voltage V2 output from current/voltage conversion unit 102, causes the signal voltage which is of the larger voltage to be input to the Vref input terminal of A/D conversion circuit 400 as maximum voltage Vmax, and causes the signal voltage whose value is smallest to be input to the Ain input terminal of A/D conversion circuit 400 as minimum signal Vmin.

A/D conversion circuit 400 comprises a Vref input terminal, Ain input terminal and Dout output terminal. A/D conversion circuit 400 sets the A/D conversion range in accordance with the voltage of the maximum signal Vmax which is input at the Vref input terminal and converts the voltage of the minimum signal (analogue signal) Vmin that is input at the Ain input terminal to a digital signal whose digital value is output from the Dout output terminal. That is, the digital output that is output from the Dout output terminal indicates the result (Vmin/Vmax) of dividing the voltage of the minimum signal Vmin by the voltage of the maximum signal Vmax.

Incidence position calculation unit 510 inputs from comparison circuit 200 a comparison result indicating the result of magnitude comparison of the respective voltages (values) of signal voltage V1 and signal voltage V2 and also inputs a digital signal that is output from the Dout output terminal of A/D conversion circuit 400; using this comparison result and the digital signal, it finds the position of beam incidence on semiconductor position detection element 10. Specifically, since it is not possible to decide solely by the digital output that is output from the Dout output terminal of A/D conversion unit 400 whether this digital output indicates the ratio (V1/V2) or the ratio (V2/V1), incidence position calculation unit 510 uses the comparison result that is output from comparison circuit 200 to decide whether the digital output that is output from A/D conversion circuit 400 indicates the ratio (V1/V2) or the ratio (V2/V1), and finds the beam incidence position on semiconductor position detection element 10 using the result of this decision.

Distance calculation unit 610 finds by the principles of trigonometry the object distance, by using the beam incidence position on semiconductor position detection element 10 found by incidence position calculation unit 510. It should be noted that incidence position calculation unit 510 and distance calculation unit 610 could respectively be implemented by digital circuits or could be implemented by software processing in a CPU. Also, incidence position calculation unit 510 and distance calculation unit 610 could be integrated and the object distance found immediately using the comparison signal output from comparison circuit 200 and the digital value output from A/D conversion circuit 400.

Limit detection unit 710 monitors the voltage of the maximum signal Vmax that is input to the Vref input terminal of A/D conversion circuit 400 and if the value thereof is smaller than a threshold value outputs a signal to that effect. That is, when only the background light component is incident on the photosensitive region of semiconductor position detection element 10 without any light that is to be detected being incident thereon, the voltage of the signal voltage V1 that is output from current/voltage conversion unit 101 and the voltage of the signal voltage V2 that is output from current/voltage conversion unit 102 are both small and approximately equal to each other and the voltage of the maximum signal Vmax and the voltage of the minimum signal Vmin are both small and approximately equal to each other. In this situation, even though the light that is to be detected is not incident on the photosensitive region of the semiconductor position detection element 10, the digital signal that is output from the Dout output terminal of A/D conversion circuit 400 indicates that light is incident at approximately the center of the photosensitive region of semiconductor position detection element 10. Accordingly, limit detection unit 710 prevents spurious detection by determining whether or not the light to be detected is incident on the photosensitive region of semiconductor position detection element 10, by monitoring the voltage of maximum signal Vmax and comparing this with a threshold value.

Figure 2:
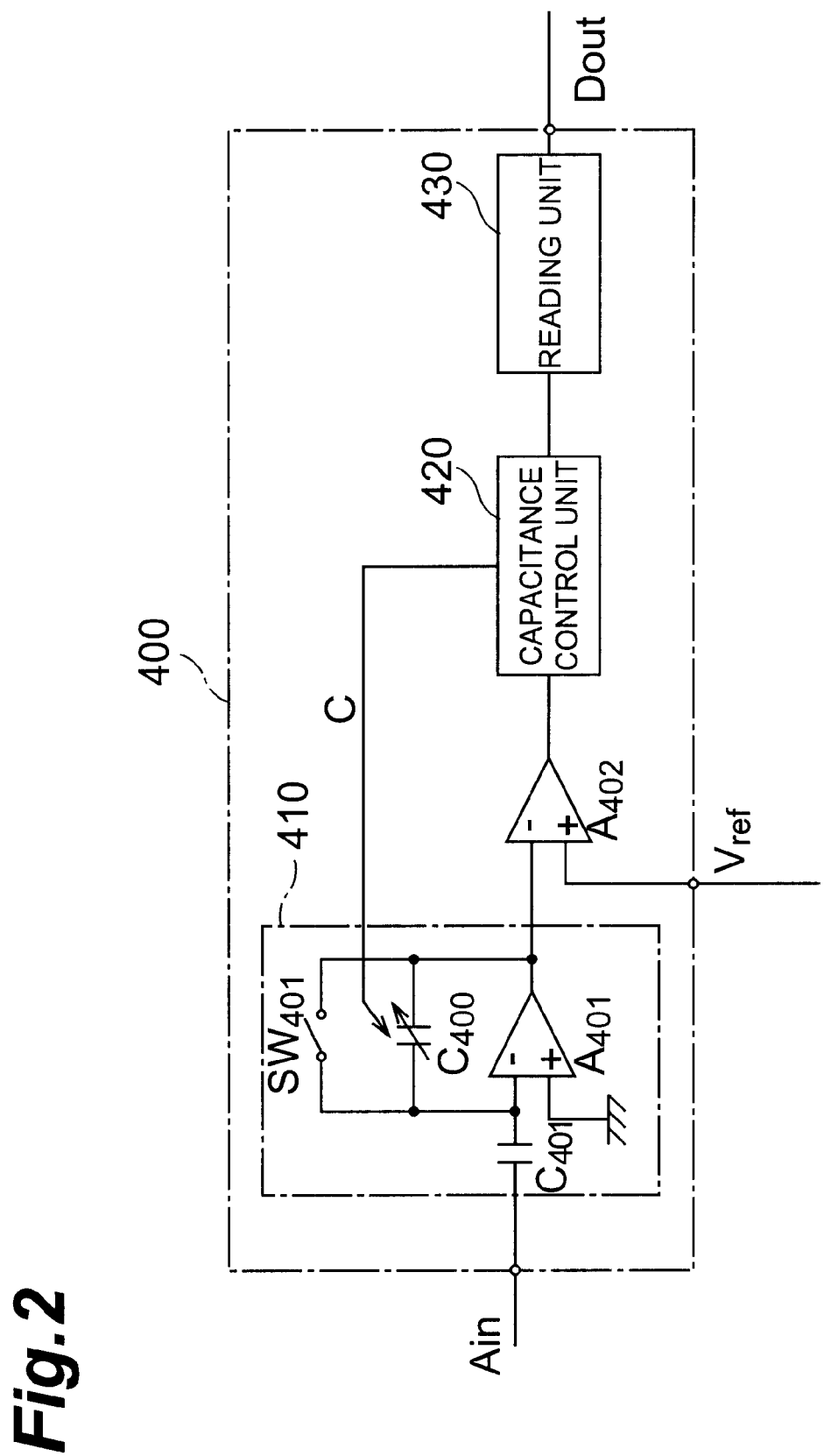
FIG. 2 is a circuit diagram of an A/D conversion circuit.

Timing control circuit 810 outputs a control signal for controlling the respective operations of the current/voltage conversion unit 101 and 102 and a control signal for controlling the illumination of the object by the spot beam or slit beam from light-emitting unit 20. FIG. 2 is the circuit diagram of A/D conversion circuit 400. A/D conversion circuit 400 comprises a variable-capacitance integrating circuit 410, comparison circuit A402, capacitance control unit 420 and reading unit 430. Variable-capacitance integrating circuit 410 comprises a capacitor C401, amplifier A401, variable-capacitance unit C400 and switch SW401. Amplifier A401 inputs the signal voltage (analogue signal) that is input to Ain input terminal to its inverting input terminal through capacitor C401. The non-inverting input terminal of amplifier A401 is grounded. Variable-capacitance unit C400 is capable of control so as to provide variable capacitance and is provided between the inverting input terminal and output terminal of amplifier A401 and stores charge in accordance with the signal voltage that it receives as input. Switch SW401 is provided between the inverting input terminal of amplifier A401 and the output terminal; when it is open, it causes accumulation of charge to be performed on variable-capacitance unit C400; when it is closed, it resets charge accumulation on variable-capacitance unit C400. Variable-capacitance integrating circuit 410 inputs a signal voltage input at the Ain input terminal, integrates this in accordance with the capacitance of variable-capacitance unit C400, and outputs an integration signal constituting the result of this integration.

Comparison circuit A402 inputs at its inverting input terminal the integrated signal output from variable-capacitance integrating circuit 410 and inputs at its non-inverting input terminal the signal voltage input to the Vref input terminal and makes a magnitude comparison of the values of these two input signals and outputs a comparison result signal representing the result of this magnitude comparison.

Capacitance control portion 420 inputs the comparison results signal that is output from comparison circuit A402 and outputs a capacitance instruction signal C that controls the capacitance of variable-capacitance unit C400 in accordance with this comparison result signal, and, if, on the basis of this comparison result signal, it concludes that the value of the integrated signal and the value of the signal voltage that is input to the Vref input terminal coincide, to a prescribed resolution, outputs a first digital value (signal) corresponding to the capacitance of variable-capacitance unit C400.

Figure 3:
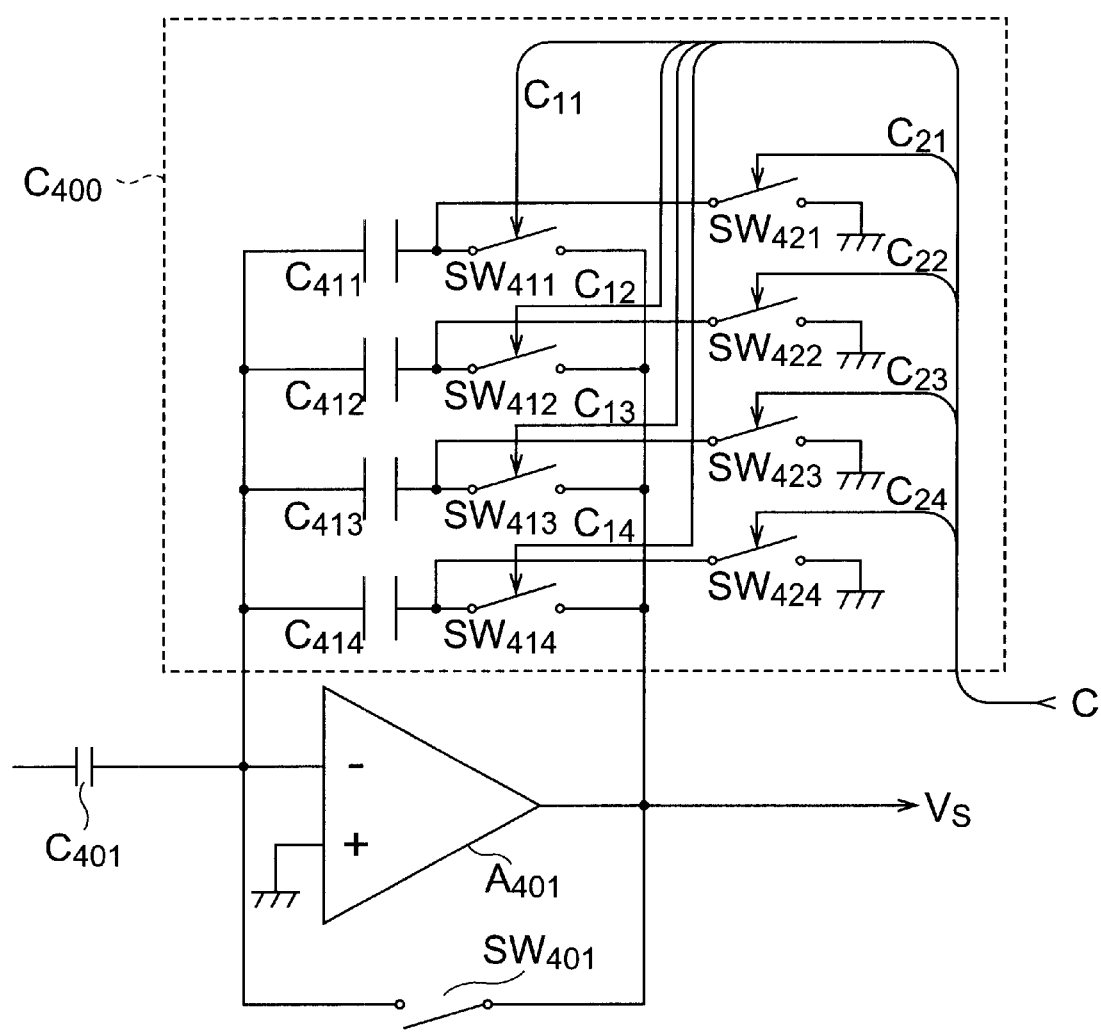
FIG. 3 is a detailed circuit diagram of a variable-capacitance integration circuit in the A/D conversion circuit.

Reading unit 430 inputs a first digital value that is output from capacitance control portion 420 and outputs a second digital value corresponding to this first digital value. The second digital value indicates a value obtained by cancelling the offset value of variable-capacitance integrating circuit 410 from the first digital value. Reading unit 430 is for example a memory element and inputs the first digital value as address and outputs data stored at this address of the memory element as the second digital value. This second digital value is output from the Dout output terminal of A/D conversion circuit 400. FIG. 3 is a detailed circuit diagram of the variable-capacitance integrating circuit 410 of A/D conversion circuit 400. This figure shows a circuit layout providing an A/D conversion function having a resolution of $\frac{1}{2}^4 = \frac{1}{16}$; this circuit layout is described below.

As shown in this figure, variable capacitance unit C400 comprises capacitors C411 to C414, switches SW411 to SW414 and switches SW421 to SW424. Capacitor C411 and switch SW411 are mutually cascade-connected, being provided between the inverting input terminal and output terminal of amplifier A401; switch SW421 is provided between ground potential and the contact point of capacitor C411 and switch SW411. Capacitor C412 and switch SW412 are mutually cascade-connected, being provided between the inverting input terminal and output terminal of amplifier A401; switch SW422 is provided between ground potential and the contact point of capacitor C412 and switch SW412. Capacitor C413 and switch SW413 are mutually cascade-connected, being provided between the inverting input terminal and output terminal of amplifier A401; switch SW423 is provided between ground potential and the contact point of capacitor C413 and switch SW413. Capacitor C414 and switch SW414 are mutually cascade-connected, being provided between the inverting input terminal and output terminal of amplifier A401; switch SW424 is provided between ground potential and the contact point of capacitor C414 and switch SW414.

Switches SW411 to SW414 are respectively opened and closed in accordance with C11 to C14 of the capacitance instruction signals C that are output from capacitance control unit 420. Switches SW421 to SW424 are respectively opened and closed in accordance with C21 to C24 of the capacitance instruction signals C that are output from capacitance control unit 420. Also, if the capacitances of capacitors C411 to C414 are represented by C411 to C414, these satisfy the relationships:

$$C411=2C412=4C413=8C414 \quad (1)$$

$$C411+C412+C413+C414=C0 \quad (2)$$

Next, the operation of the optical position detection device and distance measurement device according to this embodiment will be described. When the spot beam or slit beam from light-emitting unit 20 illuminates the object, the reflected light from the object is incident through the lens on the photosensitive region of semiconductor position detection element 10. When the beam is incident on the photosensitive region of semiconductor position detection element 10, the photoelectric current generated by the photoelectric conversion effect is distributed in a ratio corresponding to the beam incidence position, and is output as signal current I1 from first output terminal 11 and is output as signal current I2 from second output terminal 12. When signal current I1 is input to current/voltage conversion unit 101, it is subjected to current/voltage conversion, producing a signal voltage V1 corresponding to the value of signal current I1, which is output from current/voltage conversion unit 101. When signal current I2 is input to current/voltage conversion unit 102, it is subjected to current/voltage conversion, producing a signal voltage V2 corresponding to the value of signal current I2, which is output from current/voltage conversion unit 102.

The respective values of signal voltage V1 output from current/voltage conversion unit 101 and the signal voltage V2 output from current/voltage conversion unit 102 are subjected to magnitude comparison by comparison circuit 200 and the comparison signal indicating the result of the comparison is output from comparison circuit 200. Opening and closing of respective switches SW201 to SW204 is controlled in accordance with this comparison signal, so that the maximum signal (maximum signal voltage) Vmax, which has the largest value of signal voltage V1 and signal voltage V2, is input to the Vref input terminal of A/D conversion circuit 400, while the minimum signal (minimum signal voltage) Vmin, which has the smallest value of signal voltage V1 and signal voltage V2, is input to the Ain input terminal of A/D conversion circuit 400. Also, the maximum signal Vmax is compared with a threshold value by limit detecting unit 710; it is thereby sensed whether or not light to be detected is incident on the photosensitive region of semiconductor position detecting element 10.

Next, the operation of A/D conversion circuit 400 will be described using FIG. 4A, FIG. 4B, FIG. 4C and FIG. 4D. First of all, switch SW401 of variable-capacitance integrating circuit 410 is closed, putting variable-capacitance integrating circuit 410 in the reset condition. Also, switches SW411 to SW414 of variable-capacitance integrating circuit 410 are respectively closed, switches SW421 to SW424 are respectively opened, and the value of the capacitance of variable-capacitance unit C400 is set to C0. Then, at a certain time point thereafter, switch SW401 of A/D conversion circuit 400 is opened.

The minimum signal Vmin that is input to the Ain input terminal is input to variable-capacitance integrating circuit 410 of A/D conversion circuit 400. When minimum signal Vmin is input to capacitor C401 of variable-capacitance integrating circuit 410, a charge Q corresponding to the capacitance C0 of variable-capacitance unit C400 at the voltage of this minimum signal Vmin flows into variable-capacitance unit C400 (see FIG. 4A). At this point, the value Vsa of the integrated signal output from variable-capacitance integrating circuit 410 is represented by the equation:

$$Vsa=V13=Q/C0 \quad (3).$$

Figure 4A:
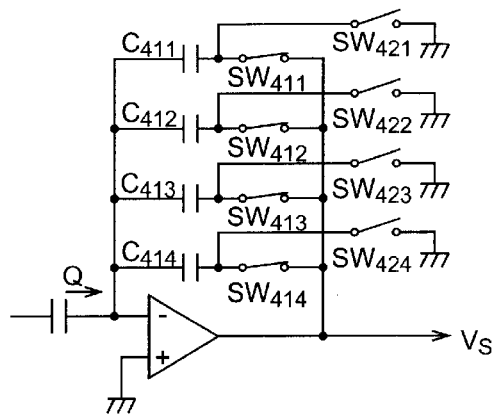
FIGS. 4A, 4B, 4C, and 4D are views given in explanation of the operation of the A/D conversion circuit.
Figure 4B:
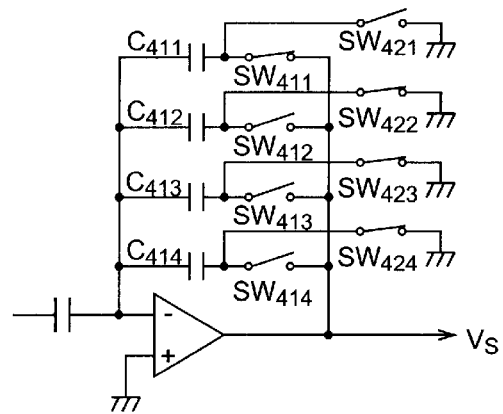
Figure 4C:
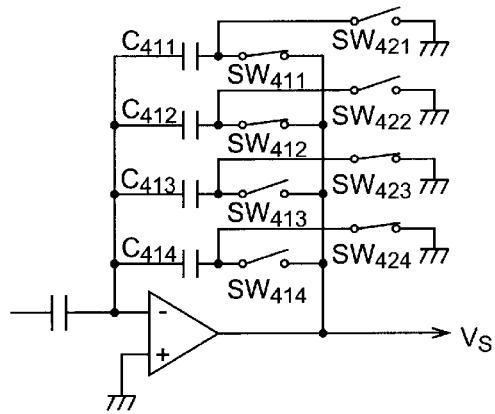

Next, capacitance control unit 420 opens switches SW412 to SW414 of variable-capacitance unit C400, and then closes switches SW422 to SW424 (see FIG. 4B). As a result, the capacitance of variable capacitance unit C400 becomes C411, and the voltage value Vsb of the integrated signal output from variable-capacitance integrating circuit 410 becomes:

$$Vsb=Q/C411 \quad (4).$$

The voltage of this integrated signal is input to comparison circuit A402, where it is subjected to a magnitude comparison with the voltage of the maximum signal Vmax which is input to the Vref input terminal. If Vsb>Vmax, on receiving the result of this comparison, capacitance control unit 420 further opens switch SW422 of variable-capacitance unit C400 and closes switch SW412 (see FIG. 4C). As a result, the capacitance of variable capacitance unit C400 becomes C411+C412, and the voltage Vsc of the integration signal that is output from variable-capacitance integrating circuit 410 becomes:

$$Vsc=Q/(C411+C412) \quad (5).$$

The voltage of this integration signal is input to comparison circuit A402, where it is subjected to a magnitude comparison with the voltage of maximum signal Vmax.

Figure 4D:
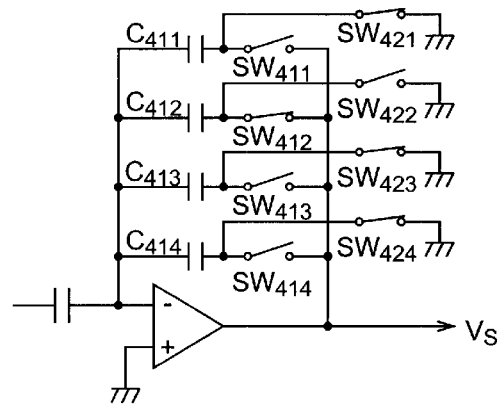

Also, if Vsb<Vmax, on receiving the result of this comparison, capacitance control unit 420 further opens switches SW411 and SW422 of variable-capacitance unit C400 and closes switches SW412 and SW421 (see FIG. 4D). As a result, the capacitance of variable capacitance unit C400 becomes C412, and the voltage Vsd of the integration signal that is output from variable-capacitance integrating circuit 410 becomes:

$$Vsd=Q/C412 \quad (6).$$

The voltage of this integration signal is input to comparison circuit A402, where it is subjected to a magnitude comparison with the voltage of maximum signal Vmax.

After this, in the same way, by means of a feedback loop comprising variable-capacitance integrating circuit 410, comparison circuit A402 and capacitance control unit 420, setting of the capacitance of variable-capacitance unit C400 and magnitude comparison of the voltage of the integration signal and the voltage of the maximum signal Vmax are repeated until it is ascertained by capacitance control unit 420 that the voltage (value) of the integration signal and the voltage (value) of the maximum signal Vmax coincide, to a prescribed resolution. The finally obtained capacitance Cx of the variable-capacitance unit C400 is expressed by the relationship:

$$C0 \cdot Vmin = Cx \cdot Vref \quad (7).$$

When capacitance control unit 420 has completed capacitance control in respect of all of the capacitors C411 to C414 of variable-capacitance unit C400 in this way, it outputs a digital value (signal) corresponding to the final capacitance of variable-capacitance unit C400 to reading unit 430. Reading unit 430 inputs as address the digital value output from capacitance control unit 420, and outputs the digital value stored at this address of the memory element. This digital value is output to incidence position calculating unit 510 from the Dout output terminal of A/D conversion circuit 400.

Incidence position calculating unit 510 finds the beam incidence position on semiconductor position detection element 10 using the digital value output from A/D conversion circuit 400 and the comparison signal output from comparison circuit 200. Also, distance calculating unit 610 finds the object distance from the beam incidence position on semiconductor position detection element 10 found by incidence position calculating unit 510, using the principles of trigonometry.

As described above, the voltage of the maximum signal Vmax that is input to comparison circuit A402 from the Vref input terminal defines the maximum value of the signal voltage with which A/D conversion can be achieved without saturating A/D conversion circuit 400, in other words, the A/D conversion range. Furthermore, since the voltage of the minimum signal Vmin that is input to the Ain input terminal of A/D conversion circuit 400 must be at or below the voltage of maximum signal Vmax, the entire A/D conversion range mentioned above can be effectively utilized. In other words, the A/D conversion circuit 400 in this embodiment cannot become saturated even if the incident light intensity is large and excellent resolution of the A/D conversion is obtained even if the incident light intensity is small. Also, in this embodiment, reliable division computation can be executed by the A/D conversion circuit 400 concurrently with the A/D conversion without needing to provide a division circuit, so the scale of the circuitry can be reduced, enabling hardware costs to be lowered and processing time to be shortened.

(Second Embodiment)

Figure 5:
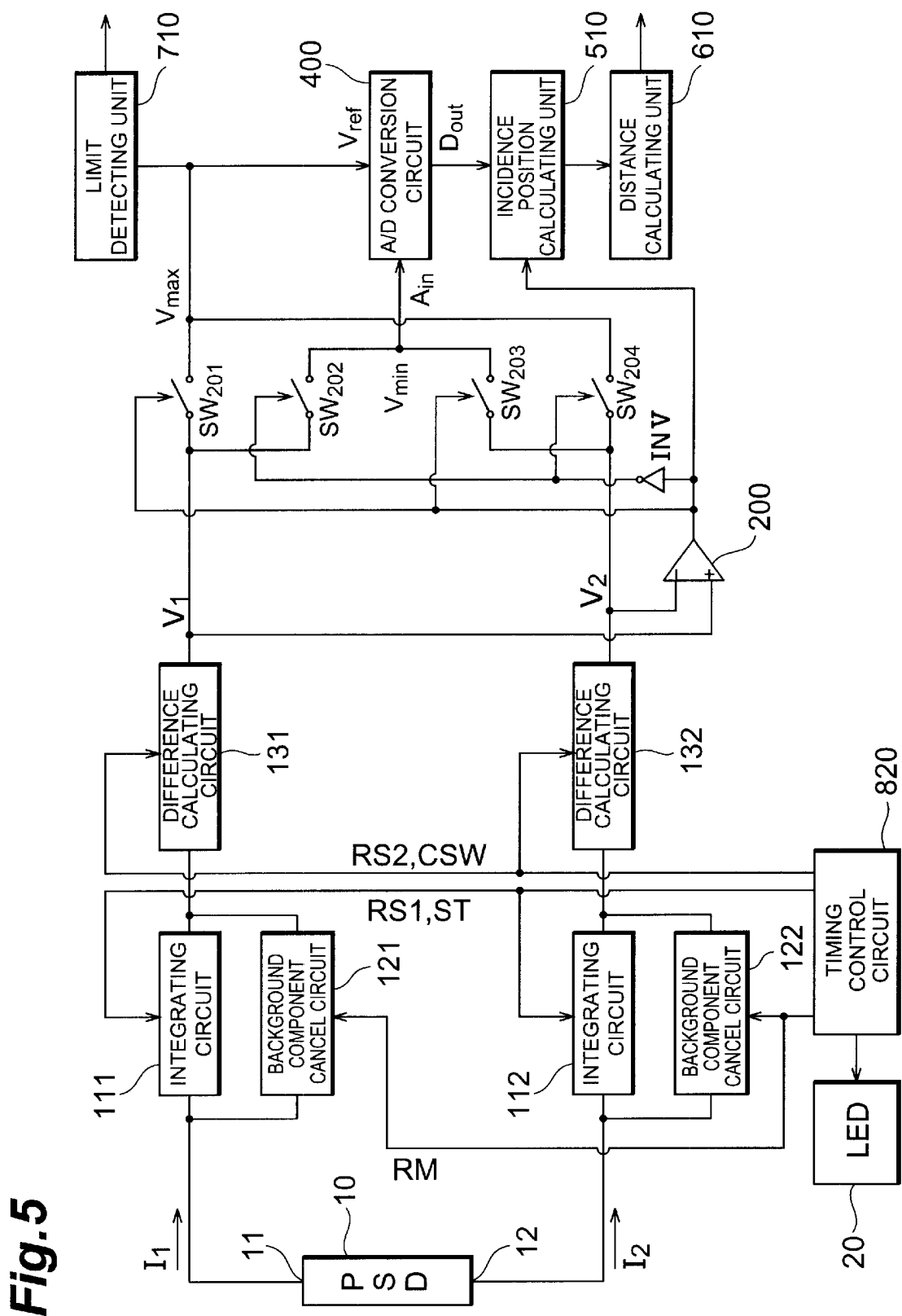
FIG. 5 is a layout diagram of an optical position detection device and distance measurement device according to a second embodiment.

Next, an optical position detection device and distance measurement device according to a second embodiment will be described. FIG. 5 is a layout diagram of an optical position detection device and distance measurement device according to the second embodiment. An optical position detection device according to this embodiment comprises a semiconductor position detection element 10, integrating circuits 111, 112, mean background component cancel circuits 121, 122, difference calculating circuits 131, 132, comparison circuit 200, logic inverting circuit INV, switches SW201 to SW204, A/D conversion circuit 400, incidence position calculating unit 510 and limit detection unit 710. A distance measurement device according to this embodiment comprises a light-emitting unit 20 and a distance calculating unit 610, in addition to the aforesaid optical position detection device. Also, the optical position detection device and distance measurement device according to this embodiment are further provided with a timing control circuit 820. Comparing with the first embodiment, the second embodiment differs in that, instead of the current/voltage conversion unit 101, it is provided with integrating circuit 111, mean background component cancel circuit 121 and difference calculating circuit 131, in that instead of current/voltage conversion unit 102 it is provided with integrating circuit 112, mean background component cancel circuit 122 and difference calculating circuit 132, and, instead of timing control circuit 810 it is provided with a timing control circuit 820.

Integrating circuits 111 and 112 are respectively of mutually identical circuit layout. Integrating circuit 111 integrates charge in accordance with the signal current I1 that is output from first output terminal 11 of semiconductor position detection element 10, and outputs a signal voltage in accordance with the amount of charge integrated. Likewise, integrating circuit 112 integrates charge in accordance with signal current I2 that is output from second output terminal 12 of semiconductor position detection element 10, and outputs a signal voltage in accordance with the amount of charge integrated.

Mean background component cancel circuits 121 and 122 are respectively of mutually identical circuit layout. Mean background component cancel circuit 121 cancels the mean value of the contribution to the background light from signal current I1 that is output from output terminal 11 of semiconductor position detection element 10. Likewise, mean background component cancel circuit 122 cancels the mean value of the contribution to the background light from signal current I2 that is output from output terminal 12 of semiconductor position detecting element 10.

Difference calculating circuits 131 and 132 are respectively of mutually identical circuit layout. Difference calculating circuit 131 finds the difference between the signal voltage that is output from integrating circuit 111 when light from light-emitting unit 20 does not illuminate the object and the signal voltage that is output from integrating circuit 111 when light from light-emitting unit 20 illuminates the object, and outputs a signal voltage V1 in accordance with this difference. Difference calculating circuit 132 finds the difference between the signal voltage that is output from integrating circuit 112 when light from light-emitting unit 20 does not illuminate the object and the signal voltage that is output from integrating circuit 112 when light from light-emitting unit 20 illuminates the object, and outputs a signal voltage V2 in accordance with this difference.

Figure 6:
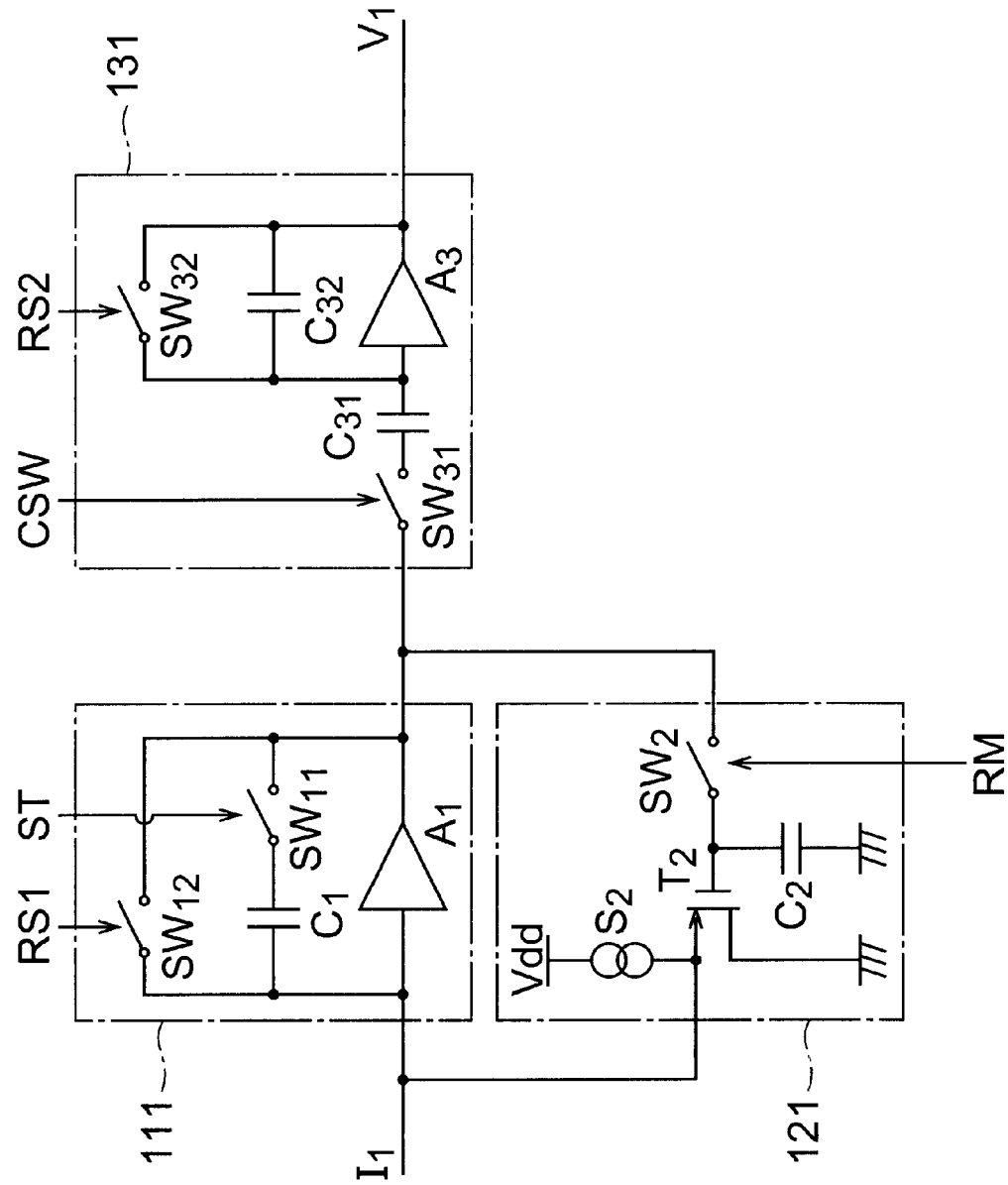
FIG. 6 is a circuit diagram of an integrating circuit, mean background component cancel circuit and difference calculating circuit.

FIG. 6 is a circuit diagram of integrating circuit 111, mean background component cancel circuit 121 and difference calculating circuit 131. The circuit diagrams of integrating circuit 112, mean background component cancel circuit 122 and difference calculating circuit 132 are identical.

Integrating circuit 111 comprises an amplifier A1, capacitor C1, switch SW11 and switch SW12. Capacitor C1 and switch SW11 are mutually cascade-connected and provided between the input and output terminals of amplifier A1. Switch SW12 is also provided between the input and output terminals of amplifier A1. Opening/closing of switch SW11 is controlled by an ST signal that is output from timing control circuit 820. Opening/closing of switch SW12 is controlled by an RS1 signal that is output from timing control circuit 820. When switch SW11 is closed and switch SW12 is open, this integrating circuit 111 integrates charge on capacitor C1 in accordance with the current component that is input to amplifier A1, of the signal current I1 output from output terminal 11 of semiconductor position detection element 10, and outputs a signal voltage corresponding to the amount of this integrated charge respectively to mean background component cancel circuit 121 and difference calculating circuit 131.

Mean background component cancel circuit 121 comprises a constant current generating source S2, MOS transistor T2, capacitor C2 and switch SW2. The source terminal of MOS transistor T2 is connected to the output terminal 11 of semiconductor position detecting element 10 and constant current generating source S2. The gate terminal of MOS transistor T2 is grounded through capacitor C2 and is connected to the output terminal of integrating circuit 111 through switch SW2. The drain terminal of MOS transistor T2 is directly grounded. Opening/closing of switch SW2 is controlled by an RM signal that is output from timing control circuit 820. This mean background component cancel circuit 121, when switch SW2 is closed, stores the signal voltage output from integrating circuit 111 in capacitor C2 and applies this signal voltage to the gate terminal of MOS transistor T2, causing a current corresponding to this gate voltage to flow from the source terminal of MOS transistor T2 to the drain terminal. Also, after switch SW2 is open, mean background component cancel circuit 121 applies the signal voltage stored on capacitor C2 to the gate terminal of MOS transistor T2, causing a current corresponding to this gate voltage to flow from the source terminal of MOS transistor T2 to the drain terminal.

Difference calculating circuit 131 comprises amplifier A3, capacitor C31, capacitor C32, switch SW31 and switch SW32. Switch SW31, capacitor C31 and amplifier A3 are connected in order from the input terminal to the output terminal and switch SW32 and capacitor C32 are mutually connected in parallel between the input/output terminals of amplifier A3. opening/closing of switch SW31 is controlled by a CSW signal that is output from timing control circuit 820. Opening/closing of switch SW32 is controlled by an RS2 signal that is output from timing control circuit 820. When switch SW32 is closed, this difference calculating circuit 131 charges capacitor C31 with a charge Q1 corresponding to the signal voltage that is output from integrating circuit 111 by closing switch SW31 for a fixed period. And when switch SW32 is open, it attempts to charge capacitor C31 with a charge Q2 corresponding to the new signal voltage that is output from integrating circuit 111 by closing switch SW31 for a fixed period. In this way, the difference of charge Q1 and charge Q2 i.e. a charge (Q1−Q2) is integrated on capacitor C32 and a signal voltage V1 corresponding to this integrated charge (Q1−Q2) is output from amplifier A3.

Next, the operation of the beam position detecting device and distance measurement device according to this embodiment will be described. When a spot beam or slit beam from light-emitting unit 20 illuminates the object, the reflected light from this object and the background light are incident on the photosensitive region of the semiconductor position detecting element 10 through the lens. When the beam is incident on the photosensitive region of semiconductor position detecting element 10, the current generated by the photoelectric effect is distributed in a ratio corresponding to the beam incidence position, so that this is output in the form of a signal current I1 from first output terminal 11 and in the form of a signal current I2 from second output terminal 12. Also, even if the spot beam or slit beam from light-emitting unit 20 does not illuminates the object, the background light component is incident on the photosensitive region of semiconductor position detecting element 10, with the result that signal currents corresponding to this background light component are respectively output from output terminals 11 and 12 of semiconductor position detecting element 10. In this embodiment, signal voltage V1 is output with the background light component canceled from signal current I1 by integrating circuit 111, mean background component cancel circuit 121 and difference calculating circuit 131. Also, signal voltage V2 is output with the background light component canceled from signal current I2 by integrating circuit 112, mean background component cancel circuit 122 and difference calculating circuit 132.

FIG. 7A, FIG. 7B, FIG. 7C, FIG. 7D, FIG. 7E, FIG. 7F, FIG. 7G, and FIG. 7H are timing charts given in explanation of the operation of integrating circuit 111, mean background component cancel circuit 121 and difference calculating circuit 131. Operation of integrating circuit 112, mean background component cancel circuit 122, and difference calculating circuit 132 is identical.

First of all, in the period T1 from time point t1 to time point t2, the light-emitting unit 20 is set in a condition with neither a spot beam nor a slit beam being output. The RM signal becomes logic H, thereby closing switch SW2 of mean background component cancel circuit 121. As the ST signal and RS1 signal are respectively logic L, switches SW11 and SW12 of integrating circuit 111 are respectively opened, and integrating circuit 111 is set in a non-integrating operating condition.

In this period T1, the sum IT of the current supplied from constant current generating source S2 of mean background component cancel circuit 121 and the output current from output terminal 11 caused by the background light that is incident on semiconductor position detecting element 10 flow into the input terminal of integrating circuit 111. By supplying the gate terminal of transistor T2 of mean background component cancel circuit 121 with the output voltage from integrating circuit 111, which is in non-integrating condition, all of this current IT is canceled by flowing from the source terminal to the drain terminal of transistor T2 of the mean background component cancel circuit 121. The voltage Vgs between the gate and source of transistor T2 in this condition is expressed by:

$$Vgs=(2\times IT/\beta)^{1/2}+Vth \quad (8)$$

Where β is a constant determined by the size of transistor T2 and Vth is the threshold value of transistor T2.

Due to the RM signal becoming logic L at time point t2, switch SW2 of mean background component cancel circuit 121 is opened. Subsequently also the current value supplied at the input terminal of integrating circuit 111 at the time point where switch SW2 was opened continues to flow through transistor T2 of mean background component cancel circuit 121. That is, the gate/source voltage Vgs of transistor T2 is held by capacitor C2, and the mean contribution of the background light, which is the main constituent of the noise in subsequent measurement, and the current supplied from constant current generating source S2 of mean background component cancel circuit 121 are thus canceled. It should be noted that the constant current generating source S2 is provided in order to ensure the current direction of transistor T2 even if the background light intensity fluctuates in subsequent measurement.

Also, due to the RS1 signal becoming logic H at time point t2, the switch SW12 of integrating circuit 111 is closed. Subsequently, due to the ST signal becoming logic H, the switch SW11 of integrating circuit 111 is closed and the capacitor C1 of integrating circuit 11 is discharged.

In the period T2 from time point t3 to time point t4, the RS1 signal becomes logic L, thereby opening switch SW12 of integrating circuit 111, and thus putting integrating circuit 111 in integrating operating condition. When this condition is set, current corresponding to the amount of change of the background light flows in the integrating circuit 111 and is charged on to capacitor C1.

As a result, since, in period T2, only background light is incident, an amount corresponding to the amount of fluctuation of the photoelectric current generated by fluctuation of the background light is charged on capacitor C1 of integrating circuit 111, so the voltage of the integration signal output from integrating circuit 111 progressively rises. If the voltage of the integration signal of integrating circuit 111 at the time point t4 after the lapse of time T from time point t3 is taken as being V11 and the current that is output from output terminal 11 of semiconductor position detection element 10 due to the amount of the fluctuation of the background light is taken as being Id, since I1=Id, $$V11 = Id \cdot \tau / C1 \quad (9).$$

During the period from immediately prior to time point t4 up to time point t4, the CSW signal is logic H, so switch SW31 of difference calculating circuit 131 is thereby closed. Also, during this period, the RS2 signal is logic H, so switch SW32 of difference calculating circuit 131 is closed. Also, the output voltage V11 from integrating circuit 111 at the time point t4 where switch SW31 is opened is held on capacitor C32 of the difference calculating circuit 131 from the time point t4 onwards. Also, since the RS1 signal becomes logic H at time point t4, switch SW12 of integrating circuit 111 is thereby closed and the capacitor C1 of integrating circuit 111 is thereby discharged.

Next, in the period T3 from time point t5 to time point t6, a spot beam or slit beam from light-emitting unit 20 illuminates the object. Also, in this period T3, the RS1 signal becomes logic L, so the switch SW12 of integrating circuit 111 is thereby opened and integrating circuit 111 is thereby put in integrating operation condition. When this condition is set, a current corresponding to the sum of the amount of change of the background light and the reflected light flows in integrating circuit 111 and is charged on to capacitor C1. It should be noted that the times τ of the respective periods T2 and T3 are mutually equal.

Taking the voltage of the integration signal of the integrating circuit 111 at the time point t6 after the lapse of time τ from time point t5 as V12, taking the current produced by the reflected spot beam component as Ish, and taking the current corresponding to the amount of background light fluctuation as being Id, since the optical intensity of the amount of fluctuation of the background light is unchanged in period T2, I1=Id+Ish, so $$V12 = (Ish + Id) \cdot \tau / C1 \quad (10).$$

During the period from immediately prior to time point t6 up to time point t6, the CSW signal is logic H, so switch SW31 of difference calculating circuit 131 is thereby closed. Also, during this period, the RS2 signal is logic L, so switch SW32 of difference calculating circuit 131 is opened. At capacitors C31 and C32 of difference calculating circuit 131 subsequent to the time point t6, by the Law of Charge Conservation, a charge is held in accordance with $$(V12-V11) \cdot C31 = V1 \cdot C32 \quad (11).$$

Then, when expression (9) and expression (10) are substituted in this expression (11), the value of the signal voltage V1 that is output from the output terminal of difference calculating circuit 131 becomes a value indicated by $$V1 = Ish \cdot \tau \cdot C31 / (C1 \cdot C32) \quad (12).$$

Also, if the respective capacitances of capacitor C31 and C32 are made mutually equal, we have $$V1 = Ish \cdot \tau / C1 \quad (13).$$

The operation of integrating circuit 112, mean background component cancel circuit 122 and difference calculating circuit 132 is identical. That is, the value of the signal voltage V2 that is output from the output terminal of difference calculating circuit 132 is expressed in the same way as expression (12) above or expression (13) above. When the signal voltages V1 and V2 respectively are obtained in this way, subsequent operation in this embodiment is the same as in the case of the first embodiment.

In addition to presenting the same benefits as the benefits presented by the optical position detection device and distance measurement device according to the first embodiment, the optical position detection device and distance measurement device according to the present embodiment present the following benefits. Specifically, in this embodiment, the background light component is canceled by providing difference calculating circuits 131, 132, finding the difference between the signal voltage V11 output from integrating circuits 111, 112 when no light from the light-emitting unit 20 illuminates the object and the signal voltage V12 which is output from the integrating circuits 111, 112 when light from light-emitting unit 20 illuminates the object, and outputting signal voltages V1 and V2 responsive to this difference. Consequently, the beam incidence position in the semiconductor position detection element 10 and/or object distance can be found accurately based solely on the reflected spot beam component. Also, in this embodiment, by cancelling the steady component of the background light by mean background component cancel circuits 121, 122 and cancelling the fluctuating component of the background light by difference calculating circuits 131, 132, the beam incidence position on semiconductor position detection element 10 and/or the object distance can be found even more accurately.

Figure 8A:
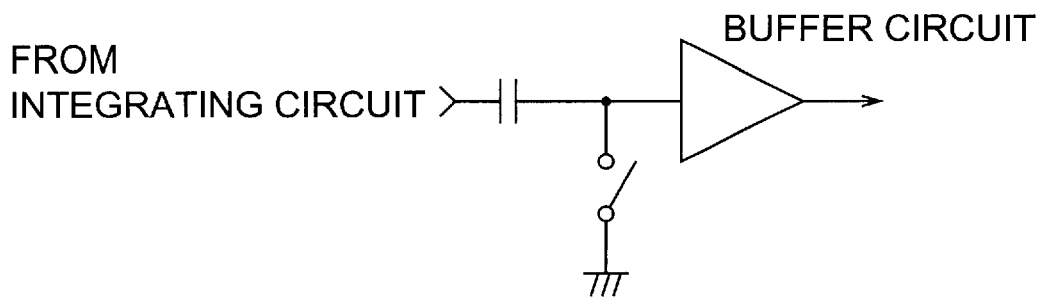
FIGS. 8A and 8B are circuit diagrams of a further difference calculating circuit.
Figure 8B:
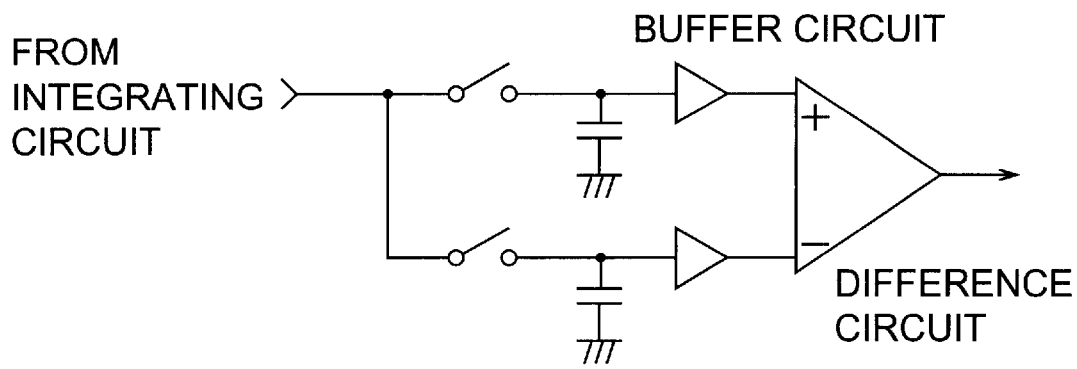

It should be noted that other circuit layouts for the difference calculating circuits 131 and 132 could be adopted. For example, as shown in FIG. 8A, a capacitor and buffer circuit could be cascade-connected and the connection point of these grounded through a switch. In this circuit, when the switch is closed, a charge Q1 is charged onto the capacitor and when the switch is opened, a charge Q2 is discharged from the capacitor; in this way, the difference of charge Q1 and charge Q2 i.e. a charge (Q1−Q2) is integrated on the capacitor, and a signal voltage corresponding to this integrated charge (Q1−Q2) is output from the buffer circuit. Also, for example, as shown in FIG. 8B, it may be arranged for signal voltage V11 to be stored on the first capacitor by closing a first switch and signal voltage V12 to be stored on the second capacitor by closing a second switch, signal voltages V11 and V12 being respectively input to a difference circuit, the difference of these two being output from the difference circuit.

(Third Embodiment)

Figure 9:
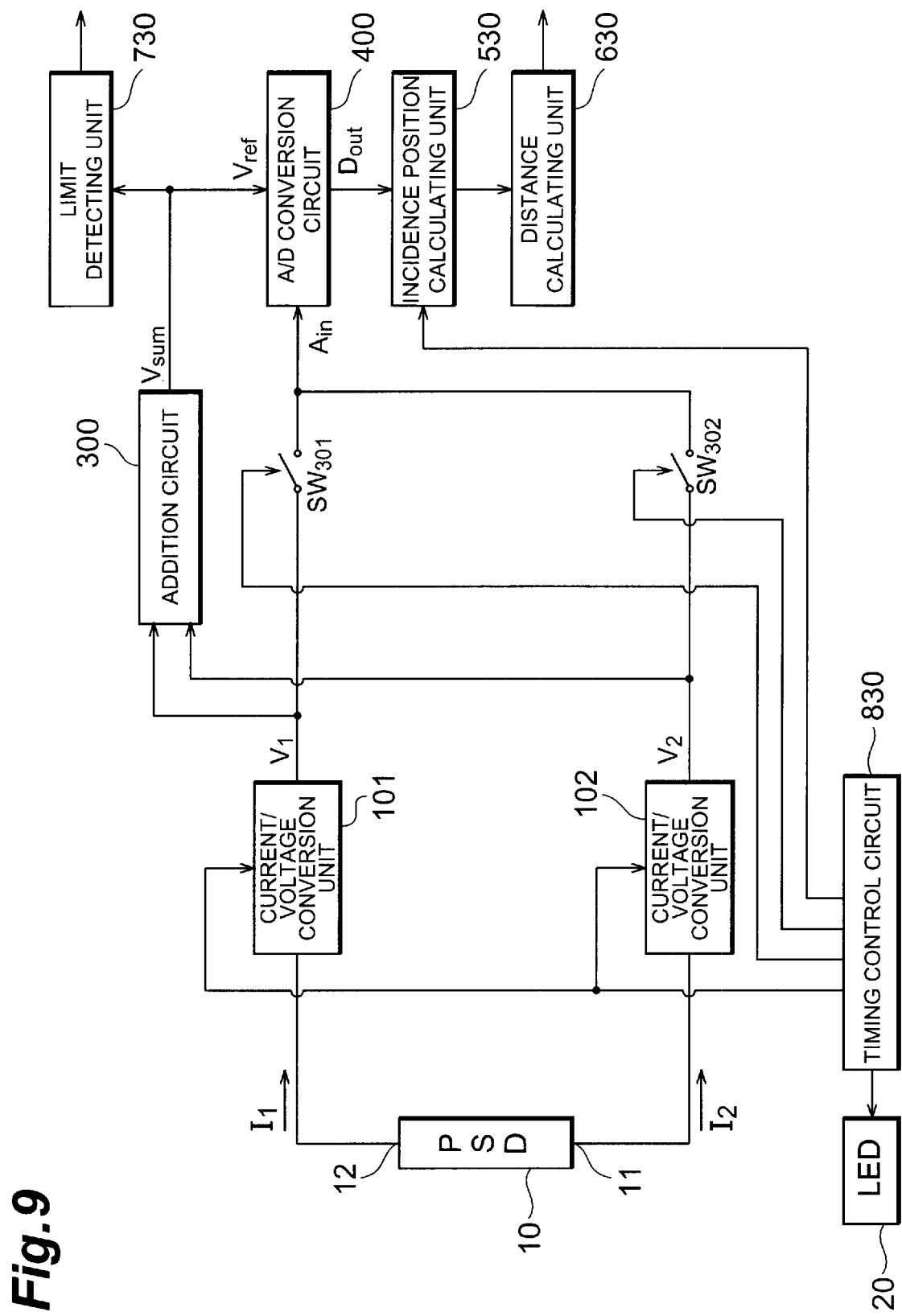
FIG. 9 is a layout diagram of an optical position detection device and distance measurement device according to a third embodiment.

Next, an optical position detection device and distance measurement device according to a third embodiment will be described. FIG. 9 is a layout diagram of an optical position detection device and distance measurement device according to the third embodiment. The optical position detection device according to this embodiment comprises a semiconductor position detection element 10, first current/voltage conversion unit 101, second current/voltage conversion unit 102, addition circuit 300, switches SW301 and SW302, A/D conversion circuit 400, incidence position calculation unit 530 and limit detecting unit 730. The distance measurement device according to this embodiment, in addition to the foregoing beam position detection device, comprises a light-emitting unit 20 and distance calculating unit 630. Also, the beam position detection device and distance measurement device of this embodiment further comprise a timing control circuit 830.

Comparing with the first embodiment, the third embodiment differs in that, instead of the comparison circuit 200 and switches SW201 to SW204, it is provided with addition circuit 300 and switches SW301 and SW302, in that, instead of incidence position calculating unit 510, it is provided with incidence position calculating unit 530, in that, instead of distance calculating unit 610 it is provided with distance calculating unit 630, in that, instead of limit detection unit 710, it is provided with limit detection unit 730, and in that, instead of timing control circuit 810, it is provided with a timing control circuit 830.

Addition circuit 300 inputs first signal voltage V1 output from first current/voltage conversion unit 101 and second signal voltage V2 output from second current/voltage conversion unit 102, adds the voltage (value) of the signal voltage V1 and the voltage (value) of the signal voltage V2, and outputs a sum signal Vsum (=V1+V2) which is the sum obtained by addition of these. Switches SW301 and SW302 are opened and closed under the control of timing control circuit 830 so as to select one or other of signal voltage V1 and signal voltage V2; the selected signal voltage is input to the Ain input terminal of A/D conversion circuit 400.

A/D conversion circuit 400 has a similar layout to that described in the first embodiment. However, in this embodiment, A/D conversion circuit 400 inputs the signal voltage Vsum that is output from the addition circuit 300 to its Vref input terminal and inputs at the signal voltage V1 or V2 selected by switches SW301 and SW302 to its Ain input terminal. Also, A/D conversion circuit 400 sets the A/D conversion range using the signal voltage Vsum that is input to its Vref input terminal, converts the signal voltage V1 or V2 that is input at its Ain input terminal to a digital signal, and outputs this digital value from the Dout output terminal. The digital value that is output from the Dout output terminal therefore indicates the result (V1/Vsum) or (V2/Vsum) of dividing the voltage (value) of signal voltage V1 or V2 by the voltage (value) of signal voltage Vsum.

Incidence position calculating unit 530 inputs the digital value (digital signal) that is output from the Dout output terminal of A/D conversion circuit 400 and uses this digital value to find the beam incidence position on semiconductor position detection element 10. It should be noted that it would be possible for A/D conversion circuit 400 to output a digital value (digital signal) indicating the ratio (V1/Vsum) and for incidence position calculating unit 530 to find the beam incidence position using this digital value or for A/D conversion circuit 400 to output a digital value (digital signal) indicating the ratio (V2/Vsum) and incidence position calculating unit 530 to find the beam incidence position using this digital value. In these cases, the opened/closed condition of respective switches SW301 and SW302 may be fixed.

Also, by successively closing switches SW301 and SW302, it may be arranged for A/D conversion circuit 400 to successively output a digital value indicating the ratio (V1/Vsum) and a digital value indicating the ratio (V2/Vsum) and for incidence position calculating unit 530 to find the position of beam incidence based on the difference of these two digital values.

Distance calculating unit 630 finds the object distance by the principles of trigonometry using the beam incidence position in semiconductor position detecting element 10 found by beam incidence calculating unit 530. Incidence position calculating unit 530 and distance calculating unit 630 may be respectively realized by digital circuits or may be realized by software in a CPU. Also, incidence position calculating unit 530 and distance calculating unit 630 may be unitary, and the object distance may be found immediately using the digital output that is output from A/D conversion circuit 400.

Limit detecting unit 730 monitors the value of the signal voltage Vsum that is output from addition circuit 300 and input to the Vref input terminal of A/D conversion circuit 400 and, if this value is smaller than a threshold value, outputs a signal indicating this. Specifically, when no light to be detected illuminates the photosensitive region of semiconductor position detecting element 10 and only the background light component is incident thereon, the voltage of the signal voltage V1 that is output from current/voltage conversion unit 101 and the voltage of the signal voltage V2 that is output from the current/voltage conversion unit 102 are both small and approximately equal, and the voltage of the signal voltage Vsum that is output from addition circuit 300 is also small. In this situation, even though no light to be detected is incident on the photosensitive region of semiconductor position detecting element 10, the digital signal that is output from the Dout output terminal of A/D conversion circuit 400 will indicate that a beam is incident approximately in the center of the photosensitive region of semiconductor position detecting element 10. Accordingly, limit detecting unit 730 monitors the voltage of the maximum signal Vsum and compares it with a threshold value, thereby preventing spurious detection by ascertaining whether or not light to be detected is incident in the photosensitive region of semiconductor position detecting element 10.

Timing control circuit 830 outputs a control signal for controlling the respective operation of current/voltage conversion units 101 and 102, a control signal for controlling the projection of light in the form of a spot beam or slit beam towards the object by light-emitting unit 20 and a control signal for controlling opening/closure of respective switches SW301 and SW302. Also, timing control circuit 830 outputs a control signal for controlling the difference calculating operation in incidence position calculating unit 530.

Next, the operation of the optical position detecting device and distance measurement device according to this embodiment will be described. When the spot beam or slit beam from light-emitting unit 20 illuminates the object, the reflected light from this object is incident on the photosensitive region of semiconductor position detecting element 10 through the lens. When the beam is incident in the photosensitive region of semiconductor position detecting element 10, the photoelectric current generated by the photoelectric conversion effect is distributed in a ratio corresponding to the position of beam incidence and is output as signal current I1 from first output terminal 11 and is output as signal current I2 from second output terminal 12. Signal current I1 is input to current/voltage conversion unit 101, where it is subjected to current/voltage conversion so that a signal voltage V1 corresponding to the value of the signal current I1 is output from current/voltage conversion unit 101. Likewise, signal current I2 is input to current/voltage conversion unit 102, where it is subjected to current/voltage conversion so that a signal voltage V2 corresponding to the value of the signal current I2 is output from current/voltage conversion unit 102.

The respective values of the signal voltage V1 output from current/voltage conversion unit 101 and signal voltage V2 output from current/voltage conversion unit 102 are added by addition circuit 300 and the signal voltage Vsum which is the result of this addition is output from addition circuit 300. The signal voltage Vsum that is output from this addition circuit 300 is input to the Vref input terminal of A/D conversion circuit 400. Also, this signal voltage Vsum is compared in magnitude with a threshold value by limit detecting unit 730, and it is thereby sensed whether or not a beam to be detected is incident in the photosensitive region of semiconductor position detecting element 10. Also, by closing switch SW301 or SW302, signal voltage V1 or signal voltage V2 is input to the Ain input terminal of A/D conversion circuit 400.

A/D conversion circuit 400 inputs at its Vref input terminal the signal voltage Vsum that is output from addition circuit 300 and inputs at its Ain input terminal the signal voltage V1 or V2 selected by switches SW301 and SW302 and performs division calculation essentially concurrently with A/D conversion by the same operation as in the case of the first embodiment. A digital signal indicating the result (V1/Vsum) or (V2/Vsum) of division of the voltage of signal voltage V1 or V2 by the voltage of signal voltage Vsum is then output from the Dout output terminal of A/D conversion circuit 400.

Incidence position calculating unit 530 finds the beam incidence position on semiconductor position detecting element 10, using the digital signal output from A/D conversion circuit 400. Also, distance calculating unit 630 finds the object distance by the principles of trigonometry, using the beam incidence position on semiconductor position detecting element 10 found by incidence position calculating unit 530.

As described above, the maximum value of the signal voltage with which A/D conversion is possible without saturating the A/D conversion circuit 400 i.e. the A/D conversion range is defined by the voltage of the maximum signal Vmax that is input from the Vref input terminal to the comparison circuit A402. Furthermore, since the value of signal voltage V1 or V2 that is input to the Ain input terminal of A/D conversion circuit 400 must be below the value of the signal voltage Vsum, the entire A/D conversion range can be effectively utilized. That is, excellent resolution of A/D conversion of the A/D conversion circuit 400 of this embodiment is obtained without any possibility of saturation even if the incident light intensity is large or even if the incident light intensity is small. Also, with this embodiment, division calculation can be performed essentially concurrently with the A/D conversion by the A/D conversion circuit 400 without needing to provide a division circuit, so the scale of the circuit is small and the hardware cost low and processing time short.

(Fourth Embodiment)

Figure 10:
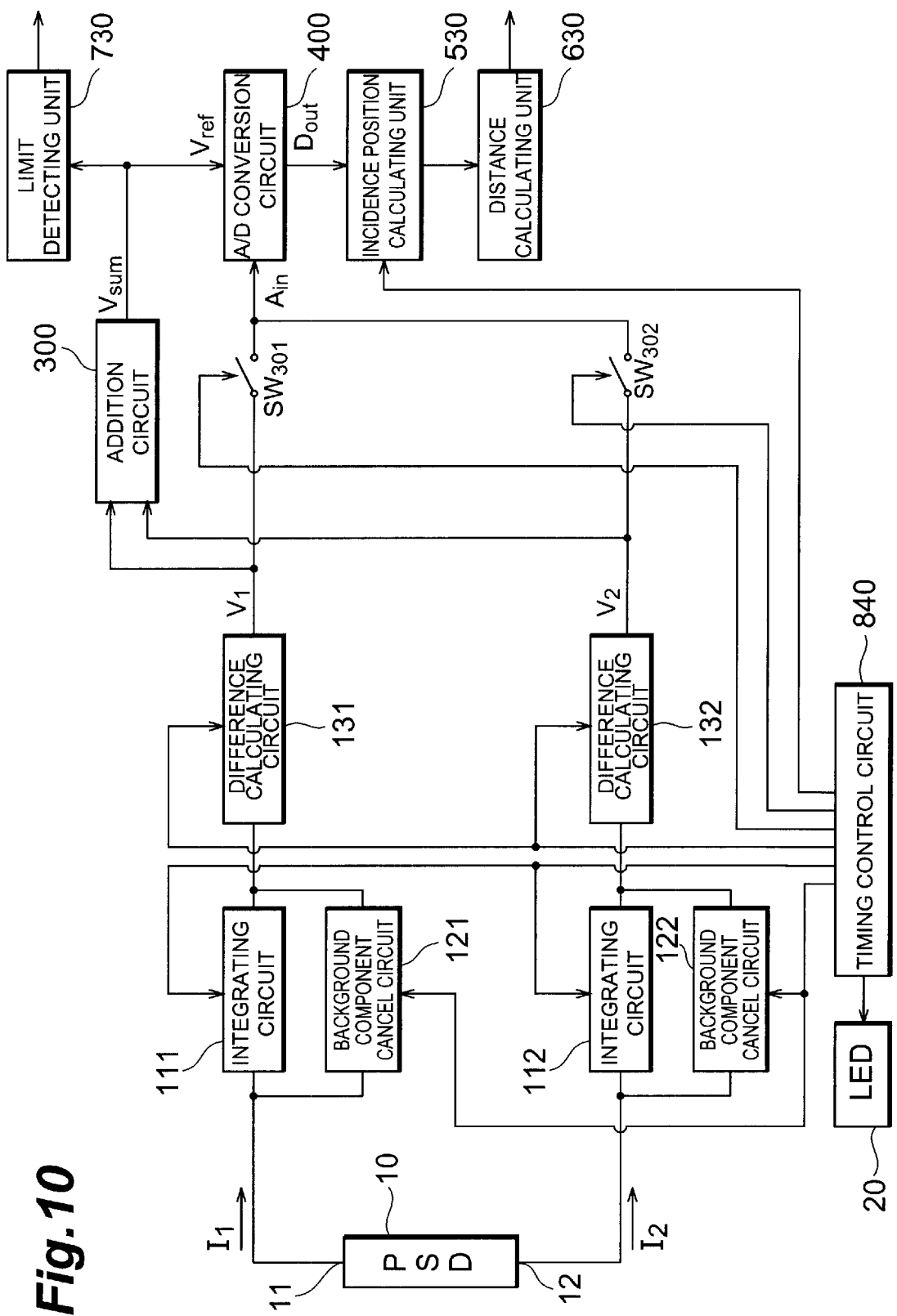
FIG. 10 is a layout diagram of an optical position detection device and distance measurement device according to a fourth embodiment.

Next, an optical position detection device and distance measurement device according to a fourth embodiment will be described. FIG. 10 is a layout diagram of an optical position detection device and distance measurement device according to the fourth embodiment. The optical position detection device according to this embodiment comprises a semiconductor position detection element 10, integrating circuits 111, 112, mean background component cancel circuits 121, 122, difference calculating circuits 131, 132, addition circuit 300, switches SW301 and SW302, A/D conversion circuit 400, incidence position calculation unit 530 and limit detection unit 730. The distance measurement device according to this embodiment comprises, in addition to the aforesaid optical position detection device, a light-emitting unit 20 and distance calculating unit 630. Also, the optical position detection device and distance measurement device according to this embodiment further comprise a timing control circuit 840.

Comparing with the third embodiment, the fourth embodiment differs in that instead of current/voltage conversion unit 101 it comprises integrating circuit 111, mean background component cancel circuit 121 and difference calculating circuit 131, in place of current/voltage conversion unit 102, it is provided with integrating circuit 112, mean background component cancel circuit 122 and difference calculating circuit 132 and in that, instead of timing control circuit 830, it is provided with timing control circuit 840.

Integrating circuit 111, mean background component cancel circuit 121 and difference calculating circuit 131 are of the same construction as the construction of the circuit diagram shown in FIG. 6 and function in accordance with timing charts identical with the timing charts shown in FIG. 7A to FIG. 7H. The same applies to integrating circuit 112, mean background component cancel circuit 122 and difference calculating circuit 132.

The operation of the optical position detection device and distance measurement device according to this embodiment is the same as the second embodiment from difference calculating circuits 131, 132 up to output of signal voltages V1 and V2; after this, it is the same as the third embodiment. Also, the benefits presented by the optical position detection device and distance measurement device according to this embodiment are the same as the benefits presented by the second embodiment and the same as the benefits presented by the third embodiment.

(Fifth Embodiment)

Figure 11:
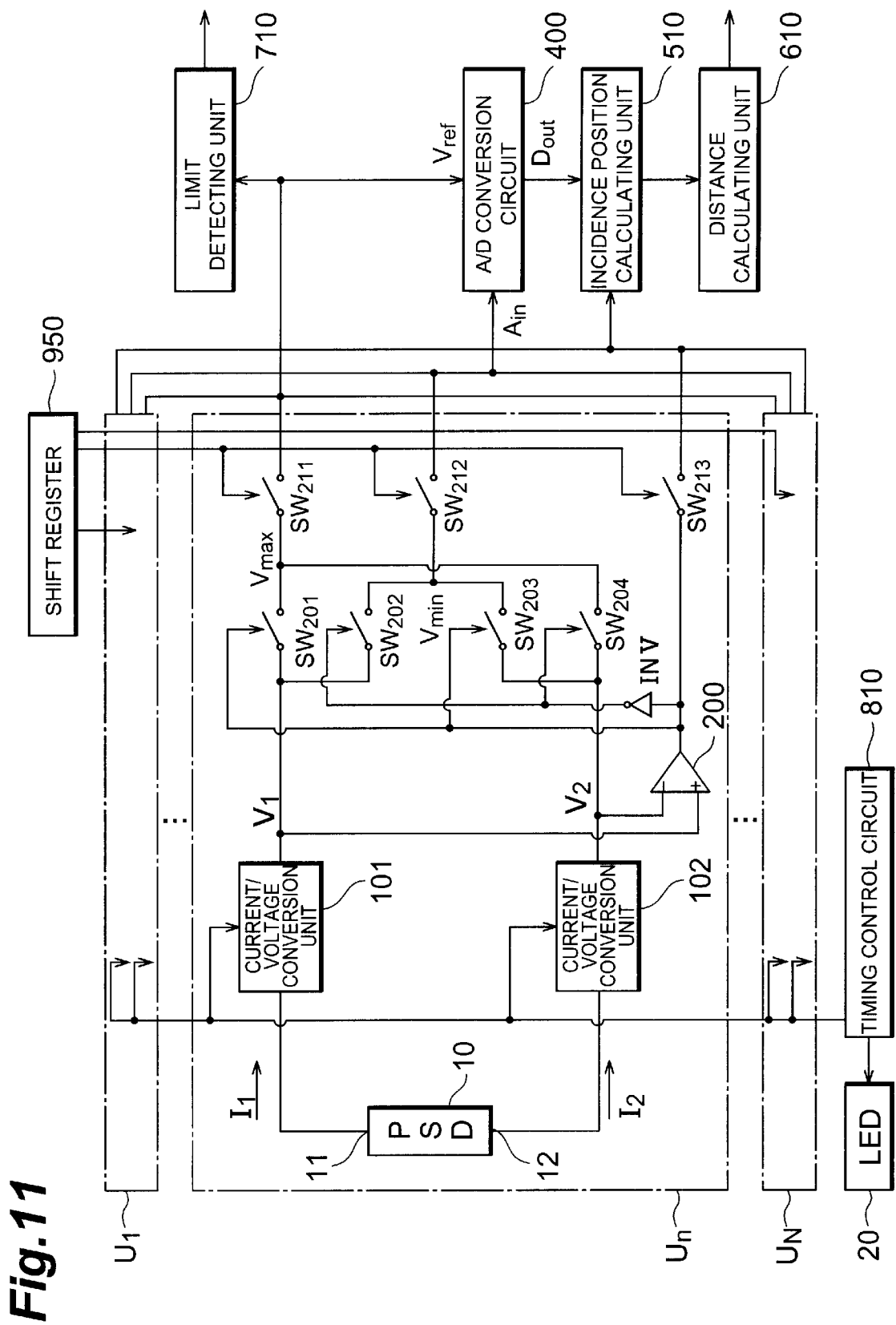
FIG. 11 is a layout diagram of an optical position detection device and distance measurement device according to a fifth embodiment.

Next, an optical position detecting device and distance measurement device according to the fifth embodiment will be described. FIG. 11 is a layout diagram of an optical position detection device and distance measurement device according to the fifth embodiment. The optical position detection device and distance measurement device according to this embodiment represent a conversion of those of the first embodiment to multi-channel form.

The optical position detection device according to this embodiment comprises units U1 to UN (N≧2), A/D conversion circuit 400, incidence position calculation unit 510, limit detection unit 710 and shift register 950. The distance measurement device according to this embodiment comprises, in addition to the optical position detection device aforementioned, a light-emitting unit 20 and distance calculating unit 610. Also, the optical position detection device and distance measurement device according to this embodiment further comprise a timing control circuit 810.

Each unit Un (1≦n≦N) is respectively of the same circuit layout, comprising a semiconductor position detection element 10, current/voltage conversion unit 101, current/voltage conversion unit 102, comparison circuit 200, logic inverting circuit INV, switches SW201 to SW204 and switches SW211 to SW213. The semiconductor position detecting elements 10 of each unit Un are arranged in array fashion. Switch SW211 controls whether or not the maximum signal Vmax is output to outside unit Un. Switch SW212 controls whether or not the maximumi signal Vmin is output to outside unit Un. Also, switch SW213 controls whether or not the comparison signal that is output from comparison circuit 200 is output to outside unit Un. Switches SW211 to SW213 in a single unit are respectively opened and closed mutually with the same timing, but opened and closed with mutually different timing between different units. Shift register 950 sequentially closes the switches SW211 to SW213 of each respective unit Un.

Until the maximum signal Vmax and minimum signal Vmin are selected, each of the respective units Un is operated in the same way as in the case of the first embodiment by switches of SW201 to SW204, and is operated with mutually identical timing. Afterwards, by means of the control signal that is output from shift register 950, first of all switches SW211 to SW213 in the first unit U1 are closed, causing the maximum signal Vmax in the first unit U1 to be input to the limit detection unit 710, the maximum signal Vmax and minimum signal Vmin in the first unit U1 to be input to A/D conversion circuit 400, and the comparison signal that is output from comparison circuit 200 in first unit U1 to be input to the incidence position calculating unit 510 i.e. the same action as in the case of the first embodiment to be performed. Subsequently, sequentially, the switches SW211 to SW213 in the n-th unit Un are closed, causing the maximum signal Vmax in the n-th unit Un to be input to the limit detection unit 710, the maximum signal Vmax and minimum signal Vmin in the n-th unit Un to be input to A/D conversion circuit 400, and the comparison signal that is output from comparison circuit 200 in n-th unit Un to be input to the incidence position calculating unit 510 i.e. the same action as in the case of the first embodiment to be performed.

With the optical position detection device and distance measurement device according to this embodiment, apart from the same benefits being presented as the benefits presented in the first embodiment, since a plurality of semiconductor position detection element 10 are provided in an array arrangement, two-dimensional detection of the position of incidence of the beam on the photosensitive region can be achieved. Also, in this embodiment, by providing the current/voltage conversion units 101 and 102 and the comparison circuit 200 etc separately for each unit Un, but making A/D conversion circuit 400, incidence position calculating unit 510, and distance calculating unit 610 and limit detection unit 710 common to each of the units Un, circuit size can be reduced and processing time shortened even though the semiconductor optical detection element 10 has been converted to multi-channel form.

It should be noted that, in this embodiment, instead of current/voltage conversion unit 101, integrating circuit 111, mean background component cancel circuit 121 and difference calculating circuit 131 may be provided and instead of current/voltage conversion unit 102, integrating circuit 112, mean background component cancel circuit 122 and difference calculating circuit 132 could be provided.

(Sixth Embodiment)

Figure 12:
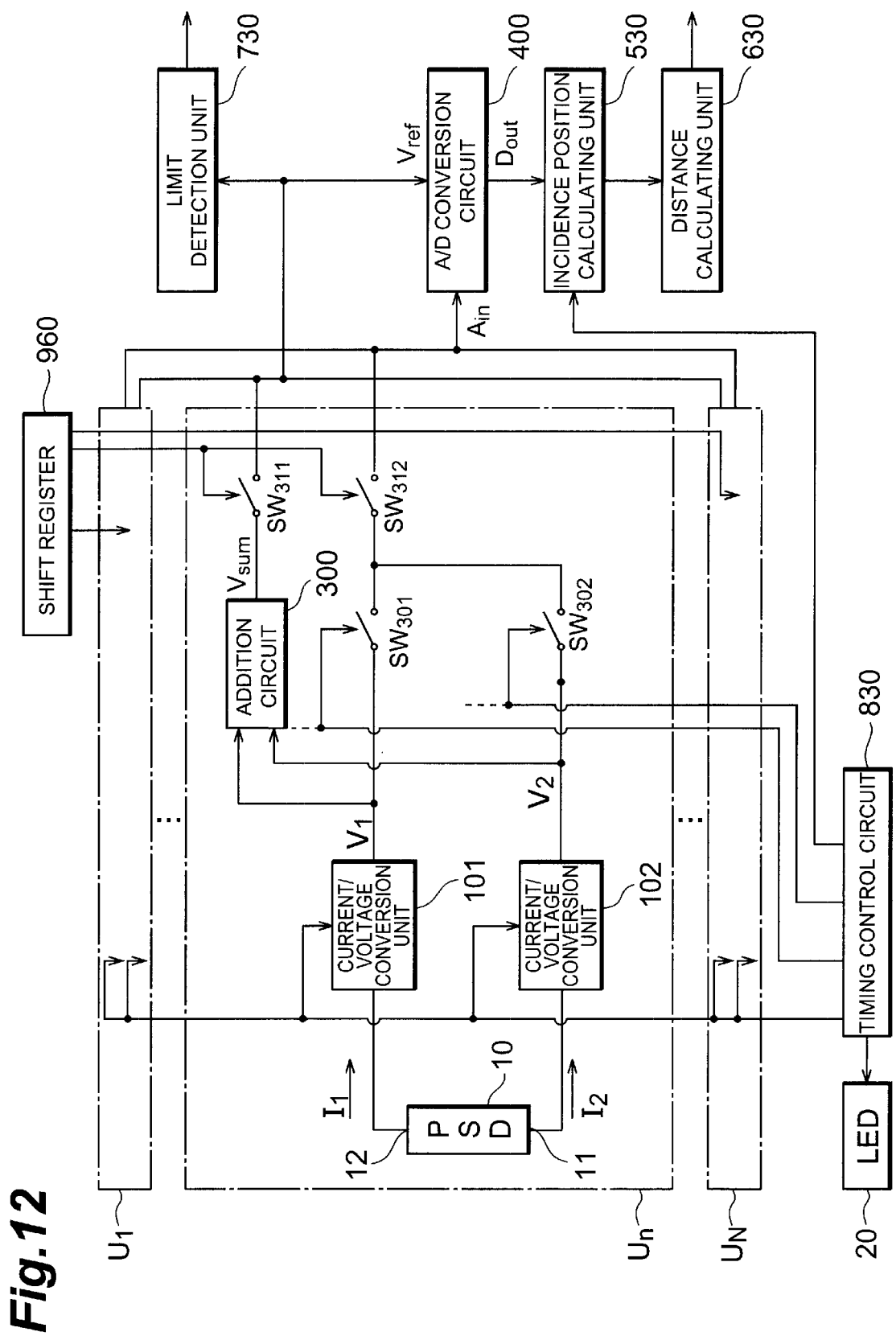
FIG. 12 is a layout diagram of an optical position detection device and distance measurement device according to a sixth embodiment.

Next, an optical position detection device and distance measurement device according to a sixth embodiment will be described. FIG. 12 is a layout diagram of an optical position detecting device and distance measurement device according to the sixth embodiment. The optical position detection device and distance measurement device according to this embodiment represent a conversion of those of the third embodiment to multi-channel form.

The optical position detection device according to this embodiment comprises units U1 to UN (N≧2), A/D conversion circuit 400, incidence position calculation unit 530, limit detection unit 730 and shift register 960. The distance measurement device according to this embodiment comprises, in addition to the optical position detection device aforementioned, a light-emitting unit 20 and distance calculating unit 630. Also, the optical position detection device and distance measurement device according to this embodiment further comprise a timing control circuit 830.

Each unit Un (1≦n≦N) is respectively of the same circuit layout, comprising a semiconductor position detection element 10, current/voltage conversion unit 101, current/voltage conversion unit 102, addition circuit 300, switches SW301 and SW302 and switches SW311 and SW312. The semiconductor position detecting elements 10 of each unit Un are arranged in array fashion. Switch SW311 controls whether or not the signal voltage Vsum that is output from addition circuit 300 is output to outside unit Un. Switch SW312 controls whether or not the signal voltage V1 or V2 selected by switches SW301 and SW302 is output to outside unit Un. Switches SW311 and SW312 respectively open and close mutually with the same timing within a single unit but close with mutually different timings between units. Shift register 960 sequentially closes respective switches SW311 and SW312 of each unit Un.

Until the respective units Un output signal voltages Vsum by means of addition circuits 300 and signal voltage V1 or signal voltage V2 is selected by switches SW301 and SW302, their operation is the same as in the case of the third embodiment and they are operated with mutually identical timings. Subsequently, under the control of the control signal output from shift register 960, first of all switches SW311 and SW312 in the first unit U1 are closed, causing signal voltage Vsum in the first unit U1 to be input to limit detecting unit 730 and signal voltage Vsum in first unit U1 and signal voltage V1 or V2 to be input to A/D conversion circuit 400 i.e. the operation is the same as in the case of the third embodiment. Subsequently, sequentially, the switches SW311 and SW312 in the n-th unit Un are closed, causing the signal voltage Vsum in the n-th unit Un to be input to limit detecting unit 730 and the signal voltage Vsum and signal voltage V1 or V2 in the n-th unit Un to be input to A/D conversion circuit 400, in an operation identical to that of the third embodiment. With the optical position detection device and distance measurement device of this embodiment, in addition to benefits identical with the benefits presented by devices according to the third embodiment, since the plurality of semiconductor position detection element 10 are arranged in array fashion, it is possible to detect the position of beam incidence on a two dimensional photosensitive region. Also, with this embodiment, since, while current/voltage conversion unit 101 and 102 and addition circuit 300 etc are individually provided for each unit Un, A/D conversion circuit 400, incidence position calculating unit 530, distance calculating unit 630 and limit detecting unit 730 are provided in common for each unit Un, even though semiconductor detecting element 10 is constituted in multi-channel form, small circuit size and short processing time can be achieved.

It should be noted that, in this embodiment also, integrating circuit 111, mean background component cancel circuit 121 and difference calculating circuit 131 could be provided instead of current/voltage conversion unit 101 and integrating circuit 112, mean background component cancel circuit 122 and difference calculating circuit 132 could be provided instead of current/voltage conversion unit 102.

As described in detail above, with the first optical position detection device according to the present invention, a first signal voltage which is output from a first current/voltage conversion unit and a second signal voltage which is output from a second current/voltage conversion unit are respectively input to a selection circuit and their respective values are compared in magnitude, a comparison signal indicating the result of the comparison is output, and, of the first and second signal voltages, the signal with larger voltage is selected and output as the maximum signal and the signal with smaller voltage is selected and output as the minimum signal, respectively. Also, in the A/D conversion circuit, an A/D conversion range is set in accordance with the maximum signal that is output from the selection circuit and the voltage of the analog minimum signal that is output from the selection circuit is converted to a digital signal and this digital value is output. The position of incidence of the beam on the semiconductor position detecting element is found by the incidence position calculating unit using the comparison signal output from the selection circuit and this digital output which is output from the A/D conversion circuit.

Also, with the second optical position detection device according to the present invention, a first signal voltage output from a first current/voltage conversion unit and a second signal voltage output from a second current/voltage conversion unit are respectively added by an addition circuit and a sum signal indicating the sum obtained by this addition is output. Also, first and second signal voltages are selected by a selection circuit and output. Furthermore, in the A/D conversion circuit, the A/D conversion range is set in accordance with the sum signal output from the addition circuit, the first or second signal voltage that is selected and output by the selection circuit is converted to a digital signal, and the digital value thereof is output. The position of beam incidence on the semiconductor position detection element is found in accordance with the digital signal that is output from the A/D conversion circuit.

Consequently, with the respective first and second optical position detection devices according to the present invention, division calculation can be implemented substantially concurrently with the A/D conversion in the A/D conversion circuit, enabling the circuit size to be reduced, thus lowering the hardware cost, and shortening processing time.

Also, if, in addition, a limit detection unit is provided that monitors the voltage of the maximum signal or the sum signal, and outputs a signal indicating whether its voltage is smaller than a threshold value, spurious detection can be prevented by deciding whether or not the beam to be detected is incident in the photosensitive region of the semiconductor position detecting element. Also, when a plurality of sets of semiconductor position detecting element, first current/voltage conversion unit and second current/voltage conversion unit etc are provided, the A/D conversion circuit, incidence position calculating unit and limit detecting unit being provided in common for each semiconductor position detecting element, small circuit size and short processing time can be achieved even though the semiconductor detecting element is employed in multichannel form and the position where the beam is incident is detected in a two dimensional photosensitive region.

Also, in the first (second) current/voltage conversion unit, charge may be integrated on a first (second) integrating circuit in accordance with the first (second) signal current and a signal voltage corresponding to the amount of the charge integrated thereon output from the first (second) integrating circuit and first (second) difference calculating circuit used to find the difference of the signal voltage output from the first (second) integrating circuit when no light from the light-emitting unit illuminates the object and the signal voltage that is output from the first (second) integrating circuit when light from the light-emitting unit illuminates the object by, and the position of incidence of the beam that is to be detected thereby accurately found by the semiconductor position detecting element by cancelling the background light component in accordance with this difference when the first (second) signal voltage is output. Also, the position of beam incidence in the semiconductor position detecting element can be even more accurately found if the mean value of the contribution of the background light is canceled from the first (second) signal current that is output from the first (second) output terminal of the semiconductor position detecting element, by the first (second) mean background component cancel circuit.

In a distance measurement device according to the present invention, a spot beam or slit beam from the light-emitting unit illuminates the object, and the reflected light therefrom is detected by a first or second optical position detecting device according to the present invention. Also, the object distance is found from the position of beam incidence on the semiconductor position detecting element found by the optical position detecting device, by the position calculating unit. Consequently, in a distance measurement device according to the present invention, division calculation can be implemented essentially concurrently with the A/D conversion by the A/D conversion circuit, so small circuit size and low hardware cost can be achieved and processing time is shortened.

What is claimed is:

1. An optical position detecting device comprising:
a semiconductor position detection element that photoelectrically converts an incident beam into carriers and outputs a first signal current from a first output terminal and outputs a second signal current from a second output terminal in response to the position of incidence of this beam;
a first current/voltage conversion unit that inputs said first signal current that is output from said first output terminal of said semiconductor position detecting element and outputs a first signal voltage in accordance with this first signal current;
a second current/voltage conversion unit that inputs said second signal current that is output from said second output terminal of said semiconductor position detecting element and outputs a second signal voltage in accordance with this second signal current;
a selection circuit that compares the magnitude of the respective values of said first signal voltage output from said first current/voltage conversion unit and said second signal voltage output from said second current/voltage conversion unit and that outputs a comparison signal indicating the result of this comparison and, of said first and said second signal voltages, selects and outputs a maximum signal whose voltage is the larger and a minimum signal whose voltage is the smaller;
an A/D conversion circuit that sets an A/D conversion range in accordance with said maximum signal output from said selection circuit, converts said minimum signal output from said selection circuit into a digital signal, and outputs this digital signal; and an incidence position calculating unit that finds the incidence position of the beam on said semiconductor position detecting element, using said comparison signal output from said selection circuit and said digital signal output from said A/D conversion circuit.

2. The optical position detection device according to claim 1, further comprising a limit detecting unit that monitors the voltage of said maximum signal output from said selection circuit and, if this voltage is smaller than the threshold value, outputs a signal indicating this fact.

3. The optical position detection device according to claim 2, comprising a plurality of sets of said semiconductor position detecting element, said first current/voltage conversion unit, said second current/voltage conversion unit and said selection circuit, wherein said A/D conversion circuit inputs sequentially said maximum signal and said minimum signal output from said selection circuits of each set;

said incidence position calculating unit sequentially inputs said comparison signals output from said selection circuits of each set; and said limit detection unit sequentially inputs said maximum signal output from said selection circuit of each set.

4. The optical position detection device according to claim 1, comprising a plurality of sets of said semiconductor position detecting element, said first current/voltage conversion unit, said second current/voltage conversion unit and said selection circuit, wherein said A/D conversion circuit inputs sequentially said maximum signal and said minimum signal output from said selection circuits of each set; and said incidence position calculating unit sequentially inputs said comparison signals output from said selection circuits of each set.

5. The optical position detection device according to claim 1, used with a light-emitting unit that illuminates the object with a spot beam or slit beam, wherein said first current/voltage conversion unit comprises:

a first integrating circuit that integrates charge in accordance with said first signal current and outputs a signal voltage corresponding to the amount of this integrated charge; and a first difference calculating circuit that finds the difference of the signal voltage output from said first integrating circuit when no light from said light-emitting unit illuminates said object and the signal voltage output from said first integrating circuit when light from said light-emitting unit illuminates said object and that outputs said first signal voltage in accordance with this difference; and wherein said second current/voltage conversion unit comprises:

a second integrating circuit that integrates charge in accordance with said second signal current and outputs a signal voltage corresponding to the amount of this integrated charge; and a second difference calculating circuit that finds the difference of the signal voltage output from said second integrating circuit when no light from said light-emitting unit illuminates said object and the signal voltage output from said second integrating circuit when light from said light-emitting unit illuminates said object and that outputs said second signal voltage in accordance with this difference.

6. The optical position detection device according to claim 5, wherein said first current/voltage conversion unit further comprises a first mean background component cancel circuit that cancels the mean value of the contribution of background light from said first signal current that is output from said first output terminal of said semiconductor position detecting element; and said second current/voltage conversion unit further comprises a second mean background component cancel circuit that cancels the mean value of the contribution of background light from said second signal current that is output from said second output terminal of said semiconductor position detecting element.

7. A distance measurement device comprising: a light-emitting unit that illuminates an object with a spot beam or slit beam; an optical position detection device according to claim 1 that detects the reflected light of the light from said light-emitting unit illuminating said object; and a distance calculating unit that finds the distance to said object using the position of beam incidence on said semiconductor position detecting element found by said optical position detection device.

8. An optical position detecting device comprising:

a semiconductor position detection element that photoelectrically converts an incident beam into carriers and outputs a first signal current from a first output terminal and outputs a second signal current from a second output terminal in response to the position of incidence of this beam;

a first current/voltage conversion unit that inputs said first signal current that is output from said first output terminal of said semiconductor position detecting element and outputs a first signal voltage in accordance with this first signal current;

a second current/voltage conversion unit that inputs said second signal current that is output from said second output terminal of said semiconductor position detecting element and outputs a second signal voltage in accordance with this second signal current;

an addition circuit that adds said first signal voltage output from said first current/voltage conversion unit and said second signal voltage output from said second current/voltage conversion unit and outputs a sum signal indicating the sum obtained by this addition;

a selection circuit that selects and outputs said first signal voltage output from said first current/voltage conversion unit or said second signal voltage output from said second current/voltage conversion unit;

an A/D conversion circuit that sets an A/D conversion range in accordance with said sum signal output from said addition circuit, converts said first or said second signal voltage selected and output by said selection circuit into a digital signal, and outputs this digital signal; and an incidence position calculating unit that finds the incidence position of the beam on said semiconductor position detecting element, using said digital signal output from said A/D conversion circuit.

9. The optical position detection device according to claim 8, further comprising a limit detecting unit that monitors the voltage of said sum signal output from said addition circuit and, if this voltage is smaller than the threshold value, outputs a signal indicating this fact.

10. The optical position detection device according to claim 9, comprising a plurality of sets of said semiconductor position detecting element, said first current/voltage conversion unit, said second current/voltage conversion unit, said addition circuit and said selection circuit, wherein said A/D conversion circuit inputs sequentially said sum signal output from said addition circuits and said first or said second signal voltage selected and output by said selection circuits of each set; and said limit detection unit sequentially inputs said sum signal output from said addition circuit of each set.

11. The optical position detection device according to claim 8, comprising a plurality of sets of said semiconductor position detecting element, said first current/voltage conversion unit, said second current/voltage conversion unit, said addition circuit and said selection circuit, wherein said A/D conversion circuit inputs sequentially said sum signal output from said addition circuits and said first or said second signal voltage selected and output by said selection circuits of each set.

12. The optical position detection device according to claim 8, used with a light-emitting unit that illuminates the object with a spot beam or slit beam, wherein said first current/voltage conversion unit comprises:

a first integrating circuit that integrates charge in accordance with said first signal current and outputs a signal voltage corresponding to the amount of this integrated charge; and a first difference calculating circuit that finds the difference of the signal voltage output from said first integrating circuit when no light from light-emitting unit illuminates said object and the signal voltage output from said first integrating circuit when light from said light-emitting unit illuminates said object and that outputs said first signal voltage in accordance with this difference; and said second current/voltage conversion unit comprises:

a second integrating circuit that integrates charge in accordance with said second signal current and outputs a signal voltage corresponding to the amount of this integrated charge; and a second difference calculating circuit that finds the difference of the signal voltage output from said second integrating circuit when no light from said light-emitting unit illuminates said object and the signal voltage output from said second integrating circuit when light from said light-emitting unit illuminates said object and that outputs said second signal voltage in accordance with this difference.

13. The optical position detection device according to claim 12, wherein said first current/voltage conversion unit further comprises a first mean background component cancel circuit that cancels the mean value of the contribution of background light from said first signal current that is output from said first output terminal of said semiconductor position detecting element; and said second current/voltage conversion unit further comprises a second mean background component cancel circuit that cancels the mean value of the contribution of background light from said second signal current that is output from said second output terminal of said semiconductor position detecting element.

14. A distance measurement device comprising: a light-emitting unit that projects a spot beam or slit beam towards an object; an optical position detection device according to claim 8 that detects the reflected light of the light from said light-emitting unit illuminating said object; and a distance calculating unit that finds the distance to said object using the position of beam incidence on said semiconductor position detecting element found by said optical position detection device.

* * * * *